(12) United States Patent
Yano et al.

(10) Patent No.: US 7,705,162 B2
(45) Date of Patent: Apr. 27, 2010

(54) INDOLIUM COMPOUNDS AND OPTICAL RECORDING MATERIALS

(75) Inventors: Toru Yano, Tokyo (JP); Koichi Shigeno, Tokyo (JP)

(73) Assignee: Adeka Corporation, Tokyo (JP)

( * ) Notice: Subject to any disclaimer, the term of this patent is extended or adjusted under 35 U.S.C. 154(b) by 103 days.

(21) Appl. No.: 11/665,449

(22) PCT Filed: Sep. 21, 2005

(86) PCT No.: PCT/JP2005/017376

§ 371 (c)(1),
(2), (4) Date: Apr. 16, 2007

(87) PCT Pub. No.: WO2006/046374

PCT Pub. Date: May 4, 2006

(65) Prior Publication Data

US 2007/0265455 A1    Nov. 15, 2007

(30) Foreign Application Priority Data

Oct. 29, 2004   (JP)   ............... 2004-315678

(51) Int. Cl.
*C07D 209/10* (2006.01)
*C07D 209/60* (2006.01)
*C07D 209/62* (2006.01)
(52) U.S. Cl. ................... 548/427; 548/503
(58) Field of Classification Search .......... 548/427, 548/503
See application file for complete search history.

(56) References Cited

U.S. PATENT DOCUMENTS

| | | | |
|---|---|---|---|
| 6,815,031 B2 | 11/2004 | Huang et al. | |
| 7,014,981 B2 | 3/2006 | Wang et al. | |
| 2002/0001774 A1 | 1/2002 | Je et al. | |
| 2002/0028918 A1 | 3/2002 | Kasada et al. | |
| 2003/0202458 A1 | 10/2003 | Wang et al. | |
| 2003/0203148 A1 | 10/2003 | Huang et al. | |

FOREIGN PATENT DOCUMENTS

| | | |
|---|---|---|
| EP | 1 170 339 | 1/2002 |
| EP | 1 460 110 | 3/2003 |
| JP | 11-34489 | 2/1999 |
| JP | 11-170695 | 6/1999 |
| JP | 2001-342366 | 12/2001 |
| JP | 2002-206061 | 7/2002 |
| JP | 2003-231359 | 8/2003 |
| JP | 2003-313447 | 11/2003 |
| JP | 2003-321450 | 11/2003 |
| JP | 2003-335061 | 11/2003 |
| WO | 02/080164 | 10/2002 |
| WO | WO 2006/018352 A1 * | 2/2006 |

OTHER PUBLICATIONS

Document No. 25:48011, retrieved from CAPLUS on Jun. 30, 2009.*
European Patent Office issued a European Search Report dated Apr. 24, 2009, Application No. 05 78 5729.4.
Chinese Patent Office issued a Chinese Office Action dated Aug. 28, 2009, Application No. 2005800368385.

* cited by examiner

*Primary Examiner*—Rebecca L Anderson
*Assistant Examiner*—Shawquia Young
(74) *Attorney, Agent, or Firm*—Young & Thompson

(57) ABSTRACT

The indolium compounds of the present invention are represented by general formula (I) below and exhibit thermal decomposition behavior further suitable for optical recording materials used in an optical recording layer of an optical recording medium for high-speed recording.

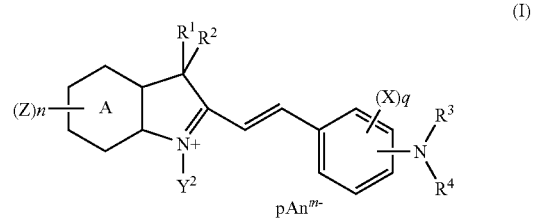

(In the formula, ring A represents a benzene or naphthalene ring; Z represents, for example, an optionally halogenated $C_{1-8}$ alkyl group that is optionally interrupted by —O—, —CO—, —OCO—, or —COO—; at least one of $R^1$ and $R^2$ represents a group represented by general formula (II) or (III), and when only one of $R^1$ and $R^2$ is a group represented by general formula (II) or (III), the other represents a $C_{1-30}$ organic group; $R^3$ and $R^4$ each represent a hydrogen atom, a $C_{1-30}$ organic group, or others; X represents a $C_{1-8}$ alkyl group, which is optionally substituted with a halogen atom or a hydroxyl group or optionally interrupted by an ether bond, or others; $Y^1$ represents a hydrogen atom or a $C_{1-30}$ organic group; n represents an integer of 0 to 4, q represents an integer of 0 to 4; $An^{m-}$ represents an m-valent anion; m represents 1 or 2; and p represents a coefficient to keep the electric charge neutral.)

8 Claims, 8 Drawing Sheets

[Fig. 1]
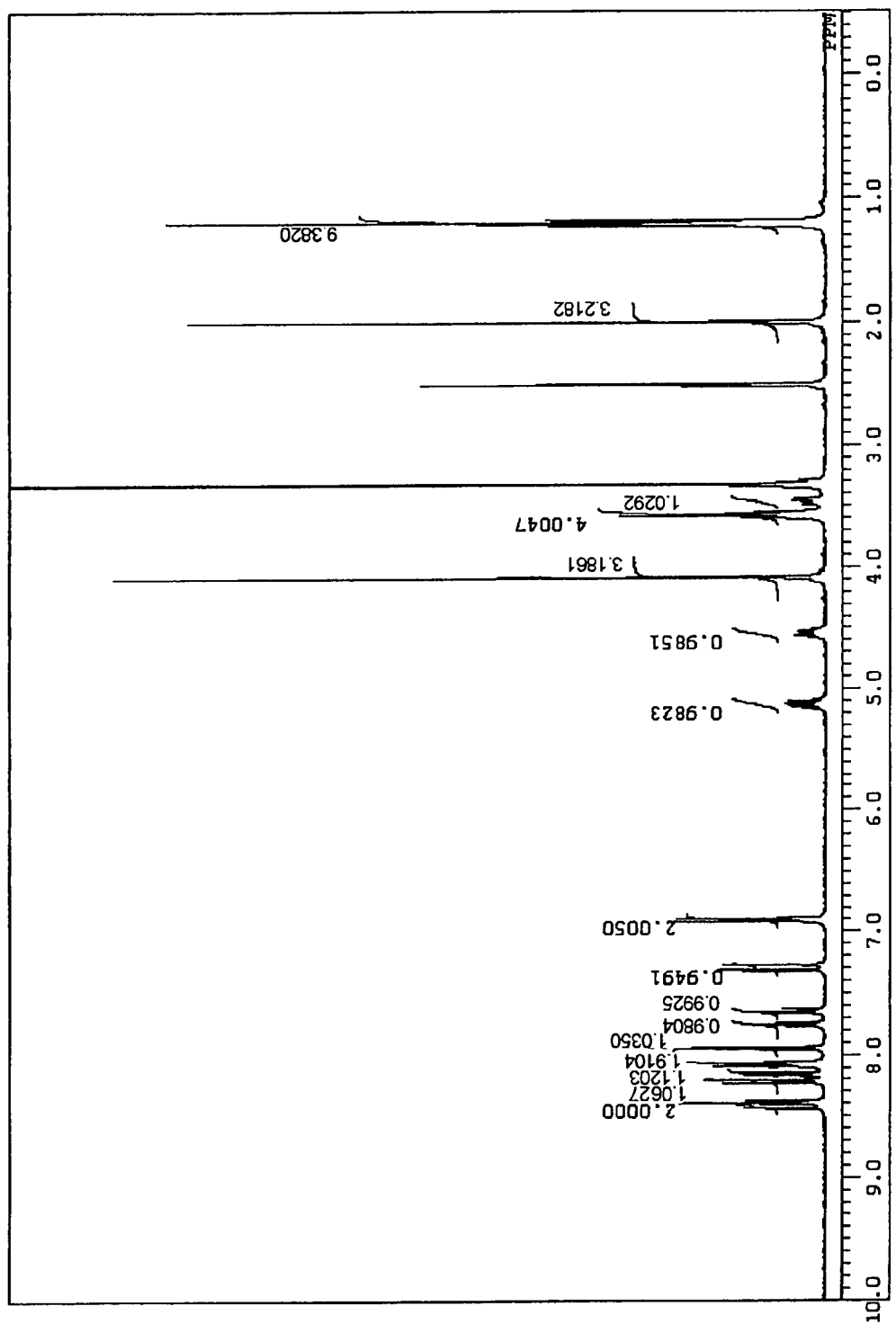

[Fig. 2]
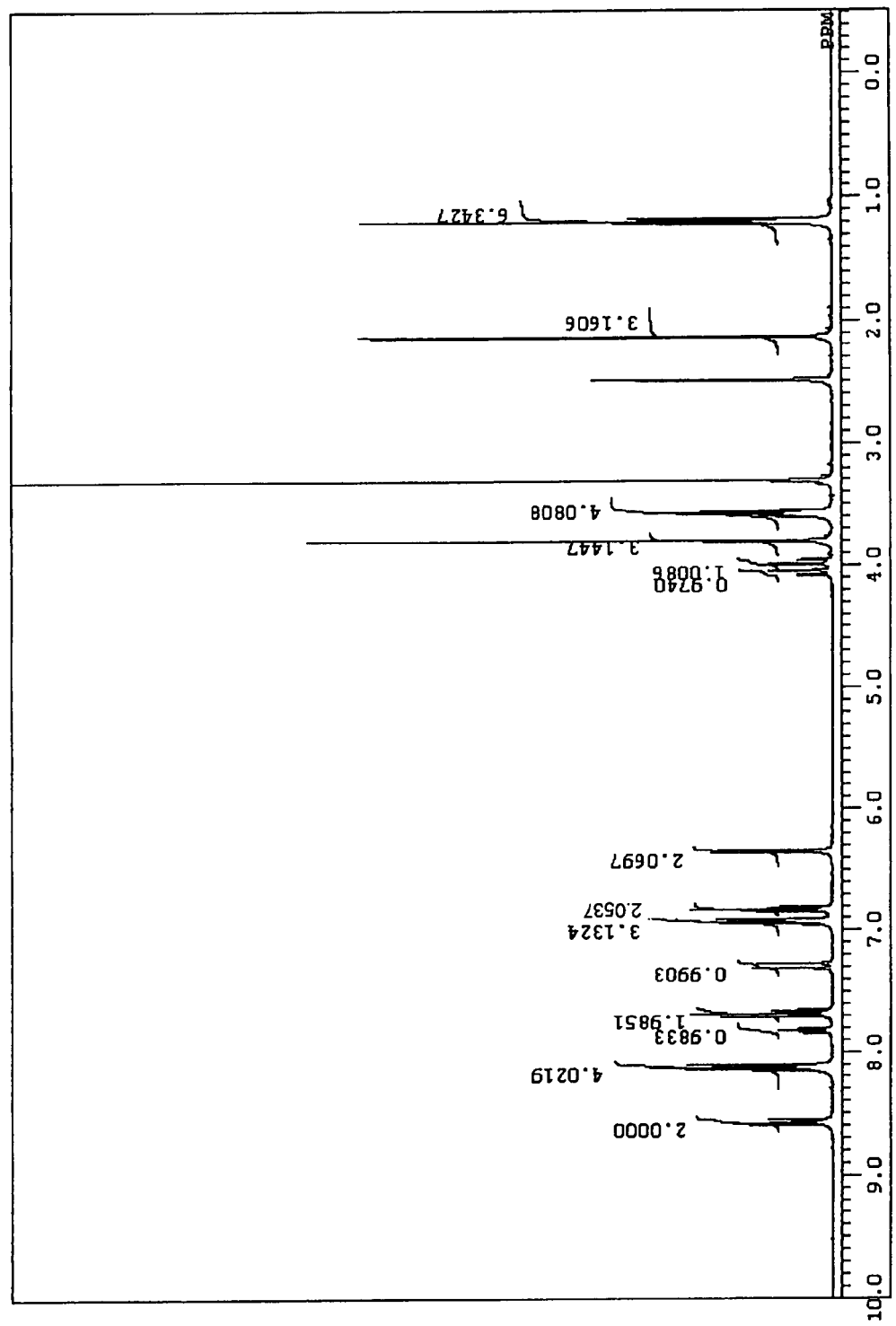

[Fig. 3]
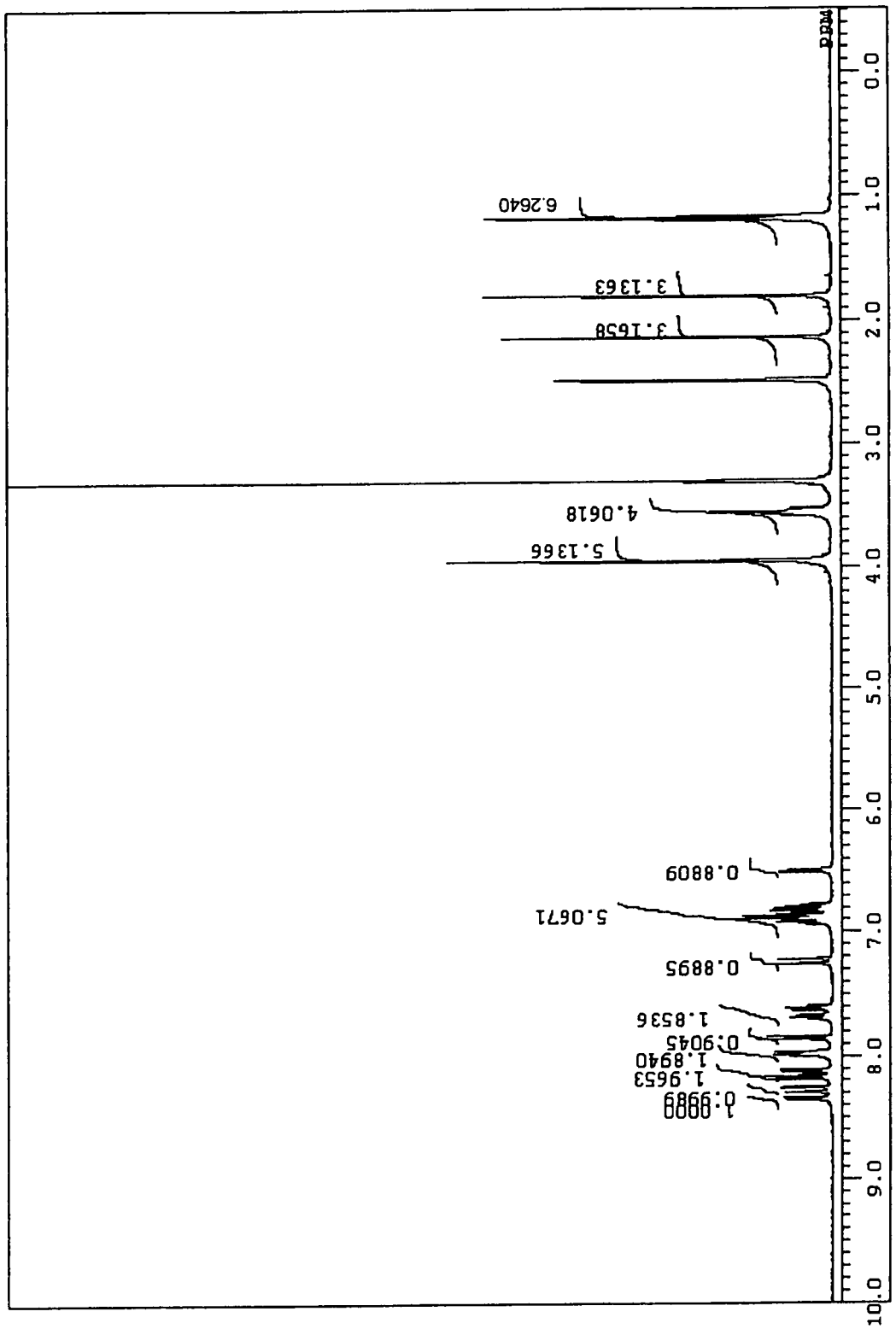

[Fig. 4]
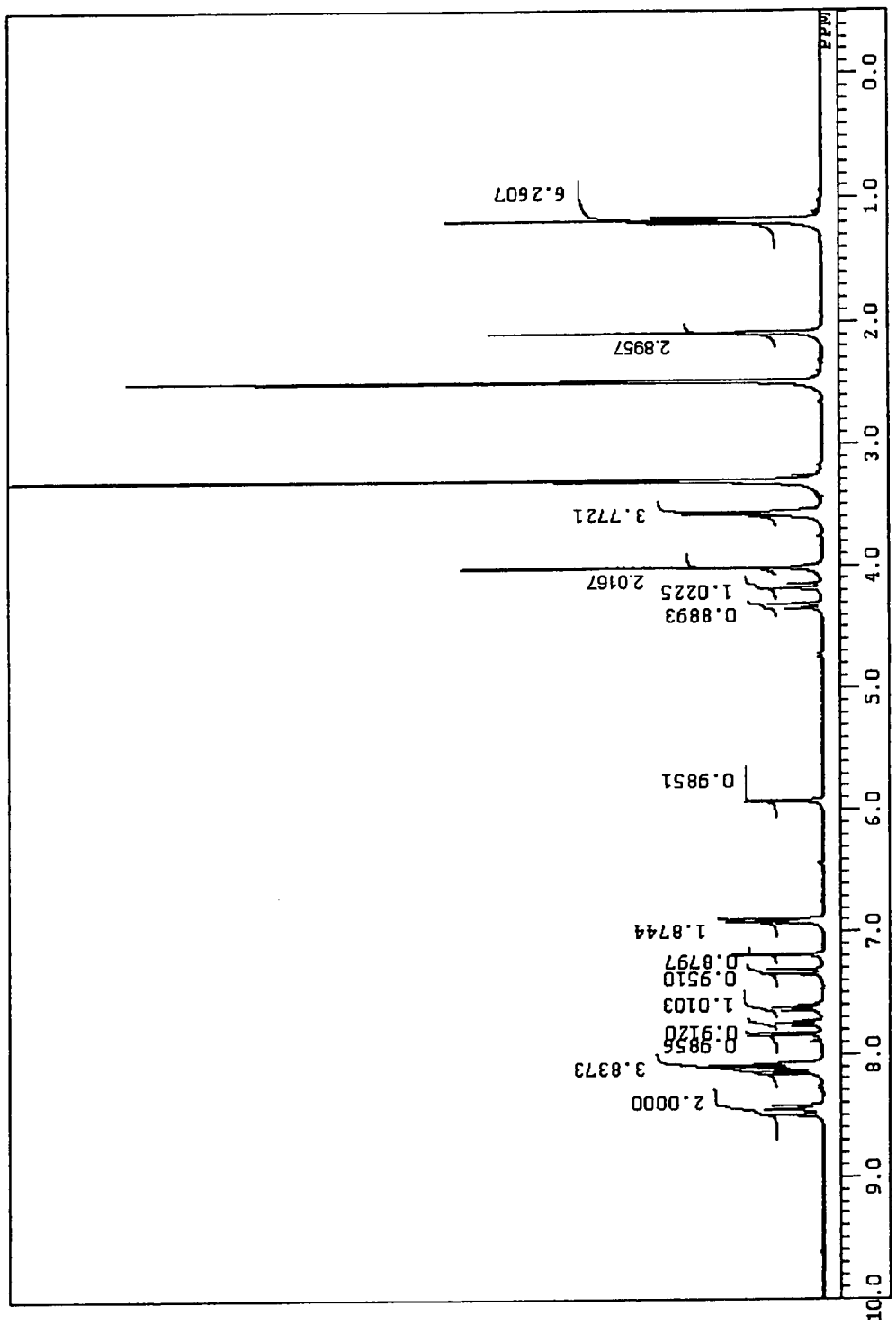

[Fig. 5]
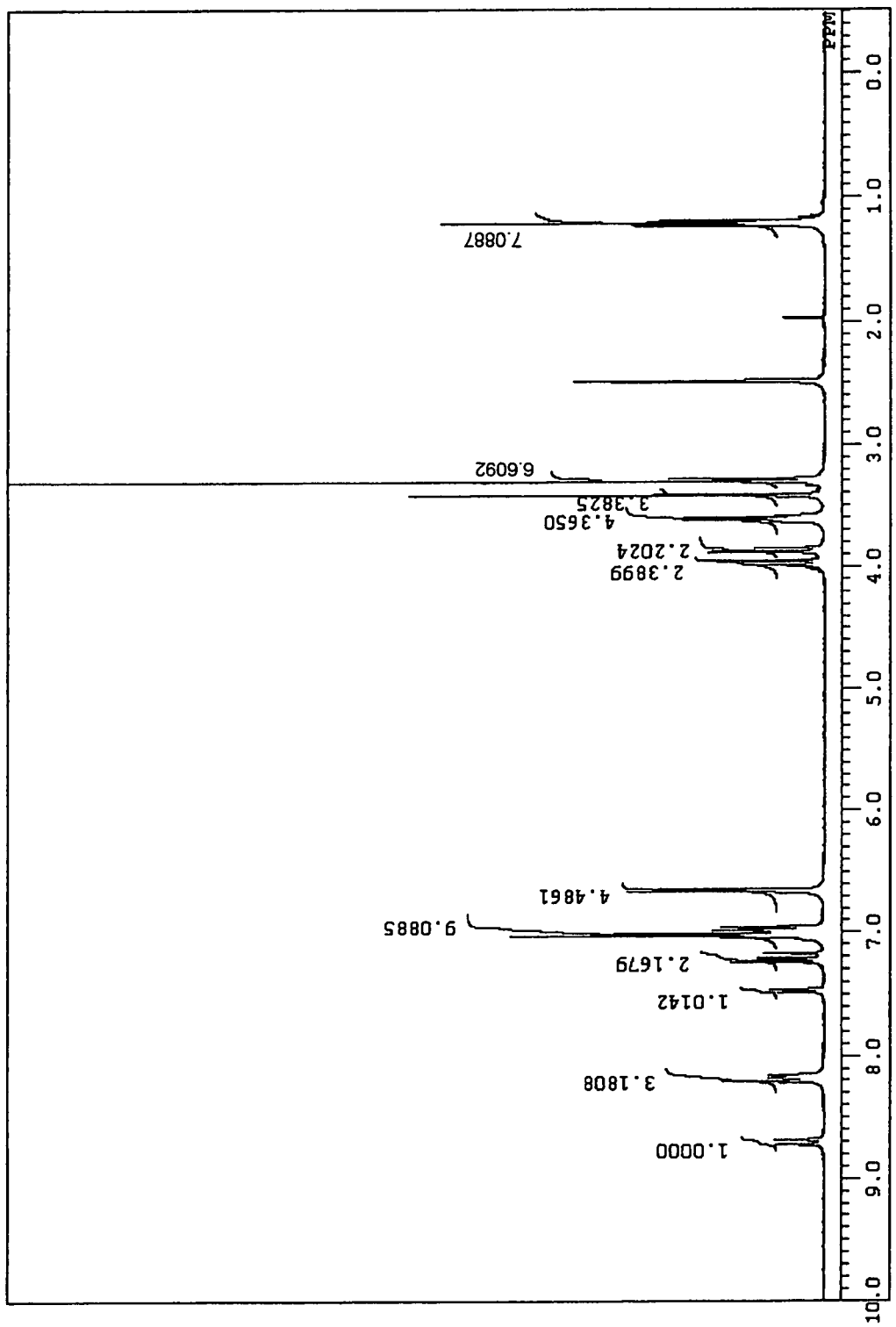

[Fig. 6]
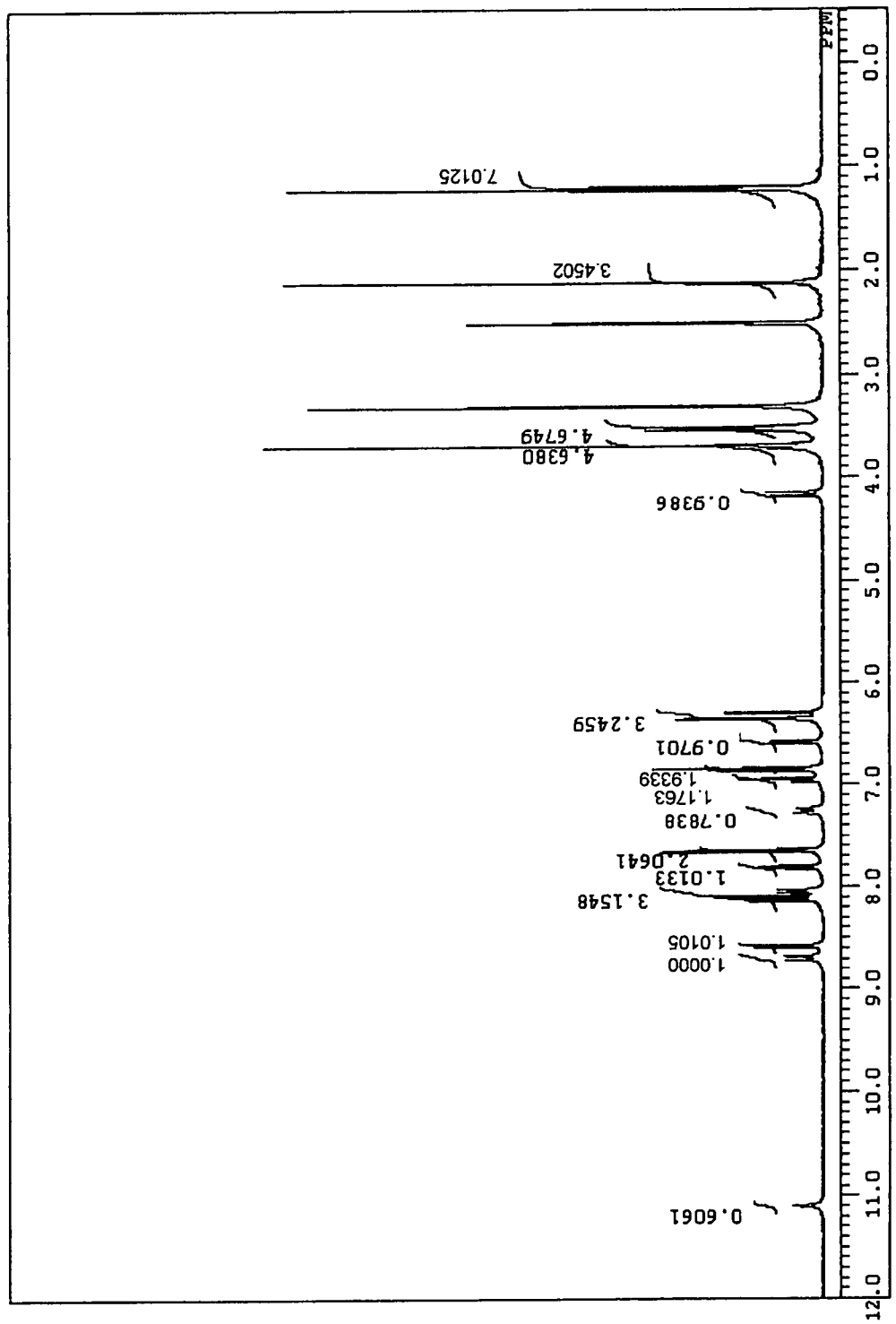

[Fig. 7]
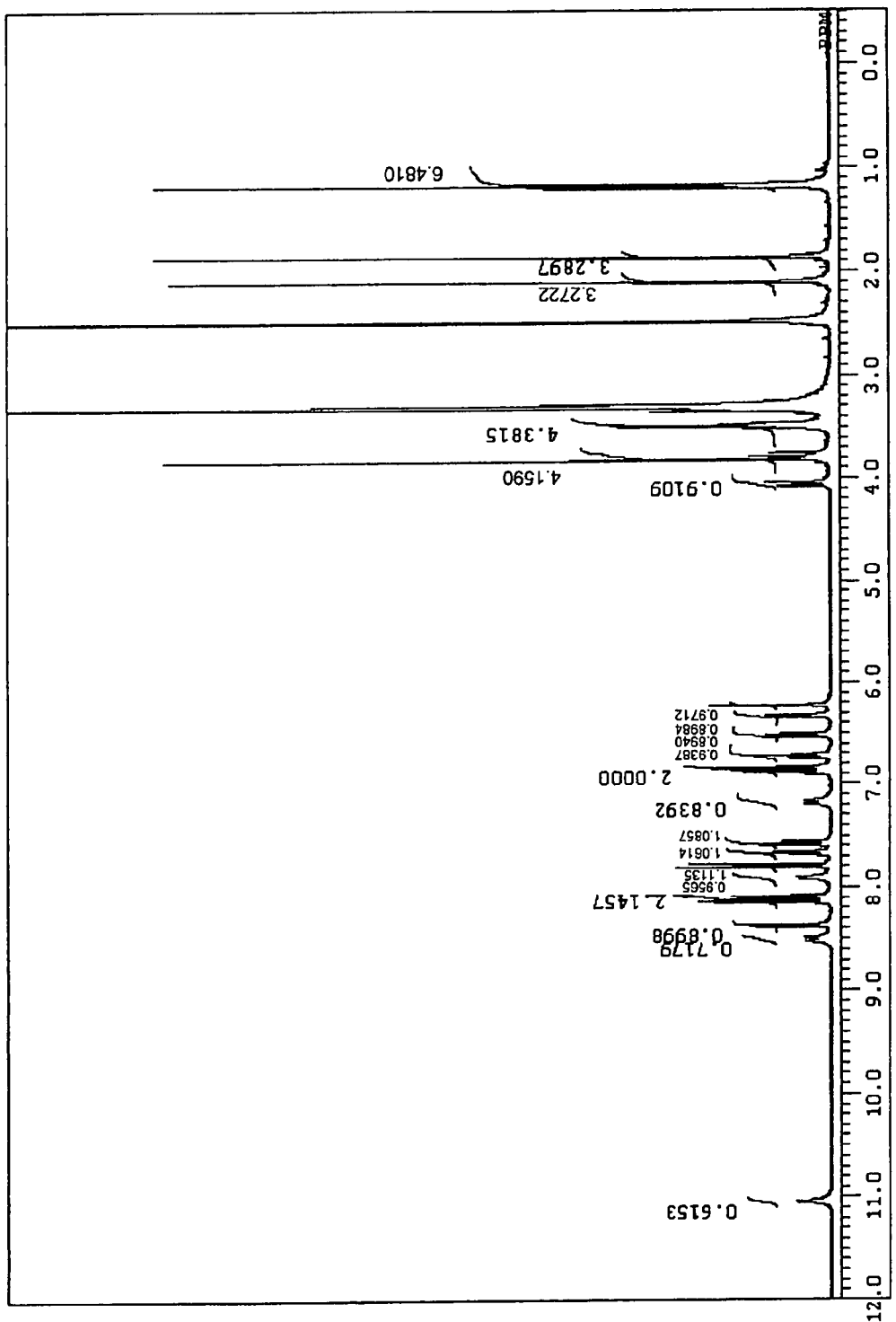

[Fig. 8]
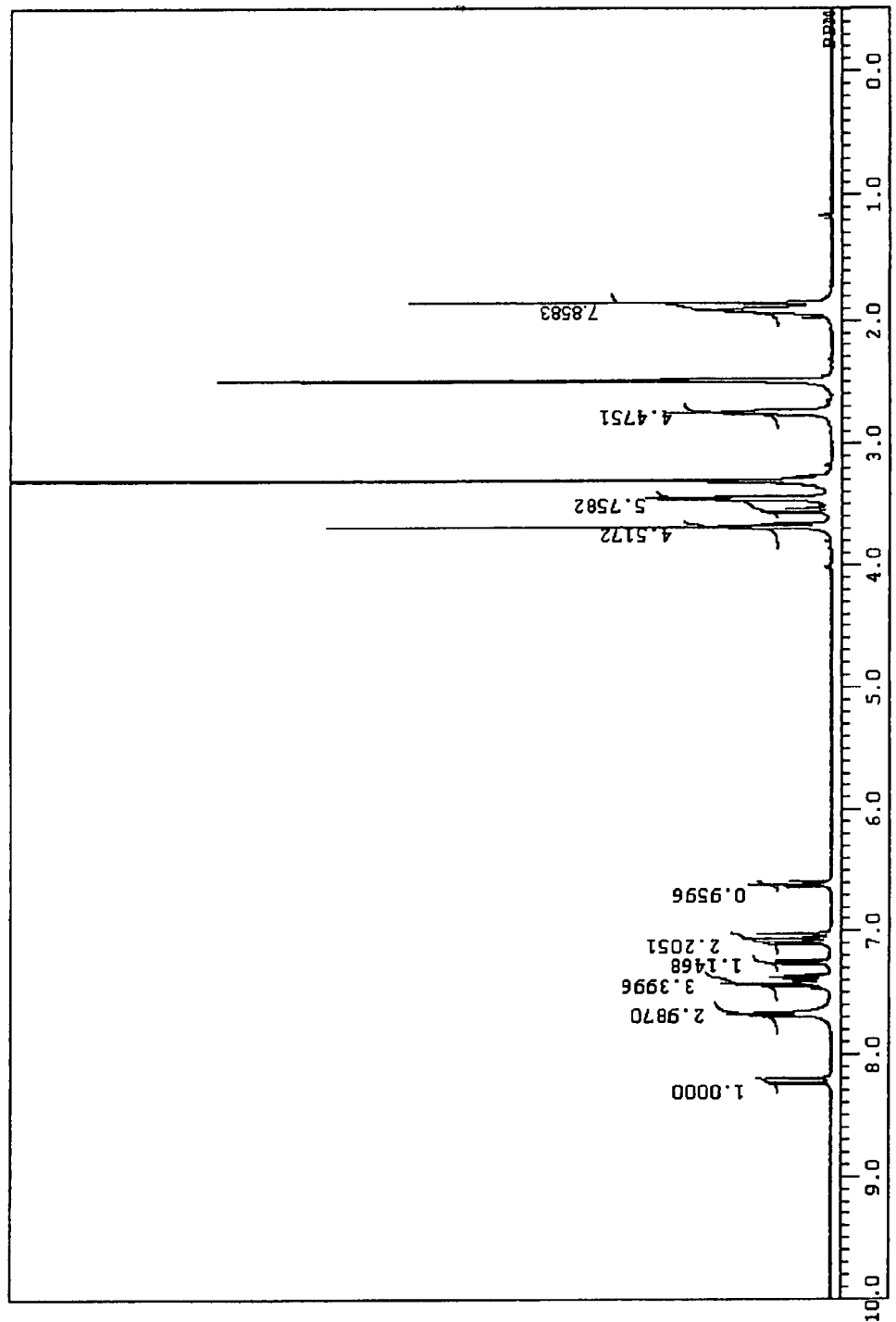

INDOLIUM COMPOUNDS AND OPTICAL RECORDING MATERIALS

TECHNICAL FIELD

The present invention relates to new indolium compounds and optical recoding materials comprising the indolium compound. The indolium compounds are, in addition to suitable for the optical recording materials, useful as light absorbing materials for optical filters of image display devices.

BACKGROUND ART

Compounds exhibiting intense light absorbance in a range of 550 to 620 nm, particularly compounds having a maximum absorbance wavelength ($\lambda_{max}$) at 550 to 620 nm, are used as optical recording materials to form an optical recording layer of optical recording media such as DVD-R.

As the optical recording materials, there are many reports with indolium compounds having an indole ring since they give merits of high sensitivity and good response to increase in recording speed. For example, Patent Documents 1 to 6 report styrylindolium compounds. Patent Document 7 reports a low-temperature decomposable cyanine compound in which a benzyl group is introduced into the 3-position of indole ring. Low-temperature decomposable compounds readily form recording segments (pits) in optical recording layers and are considered to fit for high-speed recording media.

Patent Document 1: Japanese Patent Laid-open Publication No. H11-34489
Patent Document 2: Japanese Patent Laid-open Publication No. H11-170695
Patent Document 3: Japanese Patent Laid-open Publication No. 2001-342366
Patent Document 4: Japanese Patent Laid-open Publication No. 2002-206061
Patent Document 5: Japanese Patent Laid-open Publication No. 2003-313447
Patent Document 6: Japanese Patent Laid-open Publication No. 2003-321450
Patent Document 7: Japanese Patent Laid-open Publication No. 2003-231359

DISCLOSURE OF THE INVENTION

Problems to be Solved by the Invention

Therefore, an object of the present invention is to provide indolium compounds exhibiting thermal decomposition behavior further suitable for optical recording materials used in optical recording layers of optical recording media for high-speed recording and optical recording materials comprising the compounds.

Means for Solving the Problems

After extensive study, the present inventors have recognized that indolium compounds with a particular cationic structure exhibit good thermal decomposition behaviors as optical recording materials.

The present invention is based on the above finding and provides indolium compounds represented by general formula (I) below and optical recording materials comprising the indolium compounds used in an optical recording layer of optical recording media in which the optical recording layer is formed on a substrate.

[Formula 1]

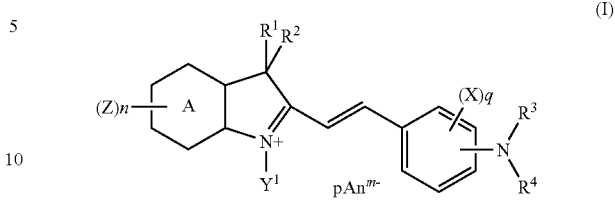

(In the formula, ring A represents a benzene or naphthalene ring; Z represents an optionally halogenated $C_{1-8}$ alkyl group that may be interrupted by —O—, —CO—, —OCO—, or —COO—, a sulfonyl group having a $C_{1-8}$ hydrocarbon group, a sulfinyl group having a $C_{1-8}$ hydrocarbon group, a $C_{1-8}$ alkylamino group, a di($C_{1-8}$ alkyl)amino group, a cyano group, a nitro group, a hydroxyl group, or a halogen atom; at least one of $R^1$ and $R^2$ represents a group represented by general formula (II) or (III) below, and when only one of $R^1$ and $R^2$ is a group represented by general formula (II) or (III), the other represents a $C_{1-30}$ organic group; $R^3$ and $R^4$ represent each a hydrogen atom or a $C_{1-30}$ organic group, or $R^3$ and $R^4$ are linked to represent a group forming a five- or six-membered heterocycle containing no multiple bonds or a group forming a five- or six-membered ring condensed with the benzene ring to which $NR^3R^4$ bonds; X represents a $C_{1-8}$ alkyl group that is optionally substituted with a halogen atom or a hydroxyl group or optionally interrupted by an ether bond, a $C_{1-8}$ alkoxy group that is optionally substituted with a halogen atom or a hydroxyl group or optionally interrupted by an ether bond, a hydroxyl group, a nitro group, a cyano group, or a halogen atom; $Y'$ represents a hydrogen atom or a $C_{1-30}$ organic group; n represents an integer of 0 to 4; q represents an integer of 0 to 4; $An^{m-}$ represents an m-valent anion; m represents 1 or 2; and p represents a coefficient to keep the electric charge neutral.)

[Formula 2]

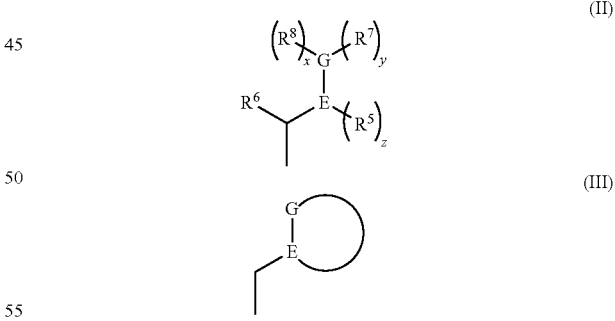

(In general formula (II), the bond between E and G is a double or triple bond; E represents a carbon atom; G represents a carbon, oxygen, or nitrogen atom; x, y, and z each represent 0 or 1; $R^5$ represents a hydrogen atom, a halogen atom, an optionally halogenated $C_{1-4}$ alkyl group, or an optionally halogenated $C_{1-4}$ alkoxy group; $R^6$, $R^7$, and $R^8$ each represent a hydrogen atom, a halogen atom, or an optionally halogenated $C_1$ alkyl group; and $R^6$ and $R^8$ may bond to form a ring. In general formula (III), the bond between E' and G' is a double bond; E' represents a carbon atom; G' represents a carbon, oxygen, or nitrogen atom; the ring containing E' and G' represents a five-membered ring optionally containing a heteroatom, a six-membered ring optionally containing a heteroatom, or a naphthalene, quinoline, isoquinoline, anthracene, or anthraquinone ring; and the ring containing E' and G' may be substituted with a halogen atom or a nitro, cyano, alkyl, or alkoxy group.)

BRIEF DESCRIPTION OF DRAWINGS

FIG. 1 is the $^1$H-NMR spectrum of indolium compound (hexafluorophosphate of compound No. 1) of the present invention obtained in Example 1.

FIG. 2 is the $^1$H-NMR spectrum of indolium compound (perchlorate of compound No. 10) of the present invention obtained in Example 2.

FIG. 3 is the $^1$H-NMR spectrum of indolium compound (hexafluorophosphate of compound No. 11) of the present invention obtained in Example 3.

FIG. 4 is the $^1$H-NMR spectrum of indolium compound (hexafluorophosphate of compound No. 18) of the present invention obtained in Example 4.

FIG. 5 is the $^1$H-NMR spectrum of indolium compound (tetrafluoroborate of compound No. 21) of the present invention obtained in Example 5.

FIG. 6 is the $^1$H-NMR spectrum of indolium compound (perchlorate of compound No. 30) of the present invention obtained in Example 6.

FIG. 7 is the $^1$H-NMR spectrum of indolium compound (perchlorate of compound No. 31) of the present invention obtained in Example 7.

FIG. 8 is the $^1$H-NMR spectrum of indolium compound (perchlorate of compound No. 40) of the present invention obtained in Example 8.

BEST MODE FOR CARRYING OUT THE INVENTION

The indolium compound of the present invention represented by general formula (I) comprises a group with particular structure at the 3-position of indole ring, has a lower decomposition temperature than conventional indolium compounds used as optical recording materials for application of DVD-R, and fits for high-speed recording.

With respect to substituent Z on the benzene or naphthalene ring represented by ring A in general formula (I), in the optionally halogenated $C_{1-8}$ alkyl group that may be interrupted by —O—, —CO—, —OCO—, or —COO—, any position may be substituted with a halogen atom or interrupted by —O—, —CO—, —OCO—, or —COO—, and —O—, —CO—, —OCO—, or —COO— may directly bond to ring A. The $C_{1-8}$ alkyl groups include, for example, methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, chloromethyl, dichloromethyl, trichloromethyl, trifluoromethyl, pentafluoroethyl, methoxy, ethoxy, propoxy, isopropoxy, butoxy, sec-butoxy, tert-butoxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, chloromethoxy, dichloromethoxy, trichloromethoxy, trifluoromethoxy, pentafluoroethoxy, 2-hydroxyethoxy, 2-methyl-2-hydroxyethoxy, 1-methyl-2-hydroxyethoxy, 3-hydroxypropoxy, 2-(2-hydroxyethoxy)ethoxy, 2-methoxyethoxy, 2-butoxyethoxy, 2-methyl-2-methoxyethoxy, 1-methyl-2-methoxyethoxy, 3-methoxypropoxy, 2-(2-methoxyethoxy)ethoxy, acetyl, acetonyl, butan-2-on-1-yl, butan-3-on-1-yl, cyclohexan-4-on-1-yl, trichloroacetyl, trifluoroacetyl, acetoxy, ethanecarbonyloxy, propanecarbonyloxy, butanecarbonyloxy, trifluoroacetoxy, and others. The $C_{1-8}$ hydrocarbon groups contained in the sulfonyl or sulfinyl group serving as substituent Z include alkyl groups such as methyl, ethyl, propyl, isopropyl, butyl, sec-butyl, tert-butyl, isobutyl, amyl, isoamyl, tert-amyl, hexyl, cyclohexyl, cyclohexylmethyl, 2-cyclohexylethyl, heptyl, isoheptyl, tert-heptyl, n-octyl, isooctyl, tert-octyl, and 2-ethylhexyl; alkenyl group such as vinyl, 1-methylethen-1-yl, propen-1-yl, propen-2-yl, propen-3-yl, buten-1-yl, buten-2-yl, 2-methylpropen-3-yl, 1,1-dimethylethen-2-yl, and 1,1-dimethylpropen-3-yl; aryl groups such as phenyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 2,3-dimethylphenyl, 2,4-dimethylphenyl, 2,5-dimethylphenyl, 2,6-dimethylphenyl, 3,4-dimethylphenyl, and 3,5-dimethylphenyl; and aralkyl groups such as benzyl, 2-methylbenzyl, 3-methylbenzyl, 4-methylbenzyl, phenethyl, 2-phenylpropan-2-yl, and styryl. The $C_{1-8}$ alkyl groups contained in the alkylamino or dialkylamino group serving as substituent Z include the alkyl groups listed above. The halogen atoms serving as substituent Z include fluorine, chlorine, bromine, and iodine atoms.

The $C_{1-30}$ organic group represented by $R^1$ to $R^4$ or $Y^1$ is not particularly limited to, but includes, for example, alkyl groups such as methyl, ethyl, propyl, isopropyl, butyl, sec-butyl, tert-butyl, isobutyl, amyl, isoamyl, tert-amyl, hexyl, cyclohexyl, cyclohexylmethyl, 2-cyclohexylethyl, heptyl, isoheptyl, tert-heptyl, n-octyl, isooctyl, tert-octyl, 2-ethylhexyl, nonyl, isononyl, decyl, dodecyl, tridecyl, tetradecyl, pentadecyl, hexadecyl, heptadecyl, and octadecyl; alkenyl group such as vinyl, 1-methylethenyl, 2-methylethenyl, propenyl, butenyl, isobutenyl, pentenyl, hexenyl, heptenyl, octenyl, decenyl, pentadecenyl, and 1-phenylpropen-3-yl; alkylaryl groups such as phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, and cyclohexylphenyl; aralkyl groups such as benzyl, phenethyl, 2-phenylpropan-2-yl, diphenylmethyl, triphenylmethyl, styryl, and cinnamyl; and groups in which the hydrocarbon group is interrupted by an ether and/or thioether bond, for example, 2-methoxyethyl, 3-methoxypropyl, 4-methoxybutyl, 2-butoxyethyl, methoxyethoxyethyl, methoxyethoxyethoxyethyl, 3-methoxybutyl, 2-phenoxyethyl, 2-methylthioethyl, and 2-phenylthioethyl. These groups may be further substituted with an alkoxy, alkenyl, nitro, or cyano group, a halogen atom, or others.

When only one of $R^1$ and $R^2$ is a group represented by general formula (II) or (III), the other is the above $C_{1-30}$ organic group. In this case, $C_{1-8}$ hydrocarbon groups, particularly $C_{1-4}$ alkyl groups, are preferred among the above $C_{1-30}$ organic groups because of a low manufacturing cost and a high molar absorption coefficient of the indole compound. When $R^3$, $R^4$, or Y' is a $C_{1-30}$ organic group, $C_{1-8}$ hydrocarbon groups, particularly $C_{1-8}$ alkyl groups, are also preferred among the above $C_{1-30}$ organic groups from a similar viewpoint.

The five- or six-membered heterocycle containing no multiple bonds formed by $R^3$ and $R^4$ linked together includes a pyrrolidine, imidazolidine, pyrazolidine, thiazolidine, isothiazolidine, oxazolidine, isooxazolidine, piperidine, piperazine, morpholine ring, or others. When $R^3$ and $R^4$ bond to form a five- or six-membered ring condensed with the benzene ring to which $NR^3R^4$ bonds, the group represented by $R^3$ and $R^4$ includes, for example, a hydrocarbon group such as —CH$_2$—CH$_2$—, —CH$_2$—CH$_2$—CH$_2$—, —CH=CH—, —CH=CH—CH$_2$—, and —CH$_2$—CH=CH—; a group in which one of methylene groups in such hydrocarbon group is replaced by O, S, or NH; and a group in which a methine group in such hydrocarbon group is replaced by N.

The $C_{1-8}$ alkyl group represented by X, which is optionally substituted with a halogen atom or hydroxyl group or optionally interrupted by an ether bond, includes methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, chloromethyl, dichloromethyl, trichloromethyl, trifluoromethyl, pentafluoroethyl, hydroxymethyl, 2-hydroxyethyl, 2-hydroxypropyl, 4-hydroxybutyl, 2-methoxyethyl, 2-butoxyethyl, 2-(2-methoxyethoxy)ethyl, and others. The $C_{1-8}$ alkoxy group represented by X, which is optionally substituted with a halogen atom or hydroxyl group or optionally interrupted by an ether bond, includes methoxy, ethoxy, propoxy, isopropoxy, butoxy, sec-butoxy, tert-butoxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, chloromethoxy, dichloromethoxy, trichloromethoxy, trifluoromethoxy, pentafluoroethoxy, 2-hydroxyethoxy, 2-methyl-2-hydroxyethoxy, 1-methyl-2-hydroxyethoxy, 3-hydroxypropoxy, 2-(2-hydroxyethoxy)ethoxy, 2-methoxyethoxy, 2-butoxyethoxy, 2-methyl-2-methoxyethoxy, 1-methyl-2-methoxyethoxy, 3-methoxypropoxy, 2-(2-methoxyethoxy)ethoxy, and others. The halogen atom represented by X includes fluorine, chlorine, bromine, and iodine. Preferably, q, which represents the number of groups represented by X, is 0 or 1.

In general formula (I), the anion represented by $An^{m-}$ includes, for example, as a monovalent anion, halogen anions such as chloride, bromide, iodide, and fluoride; inorganic anions such as perchlorate, chlorate, thiocyanate, hexafluorophosphate, hexafluoroantimonate, and tetrafluoroborate; organic sulfonates such as benzenesulfonate, toluenesulfonate, trifluoromethanesulfonate, diphenylamine-4-sulfonate, 2-amino-4-methyl-5-chlorobenzenesulfonate, and 2-amino-5-nitrobenzenesulfonate; and organic phosphates such as octylphosphate, dodecylphosphate, octadecylphosphate, phenylphosphate, nonylphenylphosphate, and 2,2'-methylenebis(4,6-di-tert-butylphenyl)phosphonate; and as a divalent anions, for example, benzenedisulfonate, naphthalenedisulfonate, and others. There may be also used, as needed, metal complex-type quencher anions having a function to deactivate (quench) an active molecule in an excited state or anions of metallocene compounds such as ferrocene or ruthenocene having an anionic group such as a carboxyl, phosphonic acid, or sulfonic acid group on the cyclopentadienyl ring.

The metal complex-type quencher anions include, for example, azo chelate complexes, anions represented by general formula (A) or (B) below, and the anions described in Japanese Patent Laid-open Publication No. S60-234892, Japanese Patent Laid-open Publication No. H5-43814, Japanese Patent Laid-open Publication No. H6-239028, Japanese Patent Laid-open Publication No. H9-309886, Japanese Patent Laid-open Publication No. H10-45767, and others.

[Formula 3]

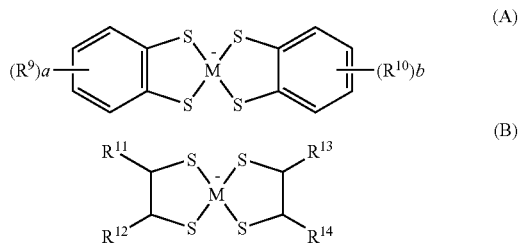

(In the formulae, M represents a nickel or copper atom; $R^9$ and $R^{10}$ each represent a halogen atom, a $C_{1-8}$ alkyl group, a $C_{6-30}$ aryl group, or —SO$_2$—Z'; Z' represents an alkyl group, an optionally halogenated aryl group, a dialkylamino, diarylamino, piperidino, or morpholino group; and a and b each represent 0 to 4. $R^{11}$, $R^{12}$, $R^{13}$, and $R^{14}$ each independently represent an alkyl, alkylphenyl, alkoxyphenyl, or halogenated phenyl group.)

In general formula (II), the halogen atom represented by $R^5$ to $R^8$ includes fluorine, chlorine, bromine, and iodine; the optionally halogenated $C_{1-4}$ alkyl group represented by $R^5$ to $R^8$ includes methyl, ethyl, propyl, isopropyl, butyl, sec-butyl, tert-butyl, isobutyl, chloromethyl, dichloromethyl, trichloromethyl, bromomethyl, dibromomethyl, tribromomethyl, fluoromethyl, difluoromethyl, trifluoromethyl, 2,2,2-trifluoroethyl, perfluoroethyl, perfluoropropyl, perfluorobutyl, and others; the optionally halogenated $C_{1-4}$ alkoxy group represented by $R^5$ includes methoxy, ethoxy, propoxy, isopropoxy, butoxy, sec-butoxy, tert-butoxy, trifluoromethoxy, and others; and the ring formed by $R^6$ and $R^8$ linked together includes a cyclobutene, cyclopentene, cyclohexene, pyrrole, dihydropyrrole, pyridine, and other rings.

In general formula (III), the five-membered ring containing E' and G', which optionally contains a heteroatom, includes a cyclopentene, cyclopentadiene, pyrrole, imidazole, pyrazole, triazole, thiophene, furan, thiazole, isothiazole, oxazole, isooxazole, dihydropyrrole, dihydroimidazole, dihydropyrazole, dihydrothiophene, dihydrofuran, dihydrothiazole, dihydroisothiazole, dihydrooxazole, dihydroisooxazole, and other rings; the six-membered ring containing E' and G', which optionally contains a heteroatom, includes a cyclohexene, benzene, pyridine, pyrazine, pyrimidine, pyridazine, pyran, thiopyran, and other rings. The ring containing E' and G' may also be substituted with a halogen atom such as fluorine, chlorine, bromine, and iodine; a nitro or cyano group; or an alkyl group such as methyl, ethyl, propyl, isopropyl, butyl, isobutyl, tert-butyl, and trifluoromethyl; or an alkoxy group such as methoxy, ethoxy, propoxy, isopropoxy, butoxy, sec-butoxy, tert-butoxy, and trifluoromethoxy.

Among the indolium compounds of the present invention, indolium compounds represented by general formula (I') below are preferred because of a low manufacturing cost and a high molar absorption coefficient.

[Formula 4]

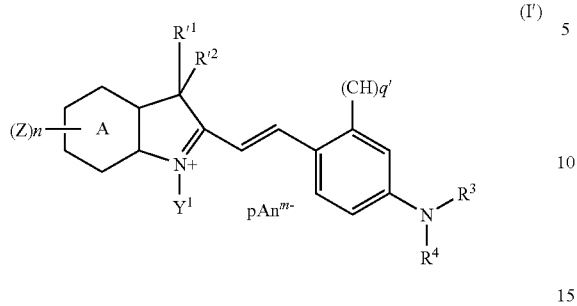

(I')

(In the formula, ring A, Z, $R^3$, $R^4$, $An^{m-}$, n, and p are defined in the same way as those in general formula (I); at least one of $R'^1$ and $R'^2$ represents a group represented by general formula (II) or (III), and when only one of $R'^1$ and $R'^2$ is a group represented by general formula (II) or (III), the other represents a $C_{1-4}$ alkyl group; $Y^2$ represents a $C_{1-8}$ alkyl group; and q' represents 0 or 1.)

$R^3$ and $R^4$ in general formula (I) or (I') are preferably $C_{1-8}$ alkyl groups, a group in which $R^3$ and $R^4$ bond to form a five- or six-membered heterocycle containing no multiple bonds, or a group in which $R^3$ and $R^4$ bond to form a five- or six-membered ring condensed with the benzene ring to which $NR^3R^4$ bonds, particularly from a viewpoint of a low manufacturing cost and a high molar absorption coefficient of the indolium compound.

Preferred specific examples of the indolium compounds of the present invention represented by general formula (I) include compounds No. 1 to 54 below. The following illustrations show only indolium cations with any anion omitted.

[Formula 5]

Compound No. 1

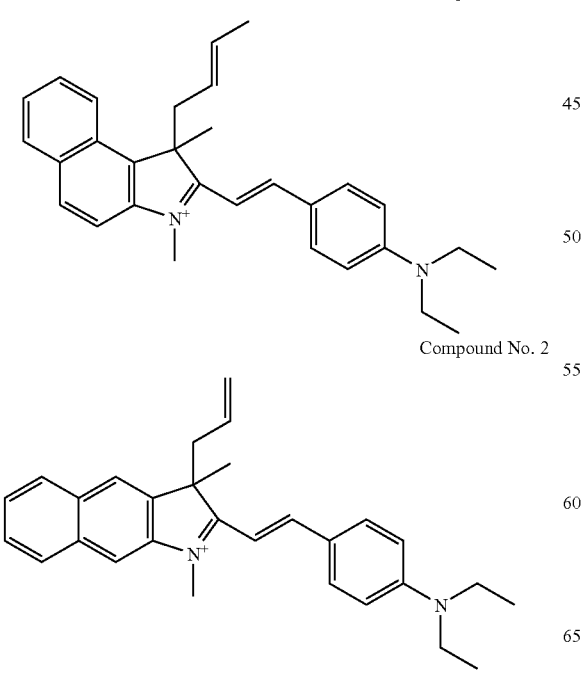

Compound No. 2

Compound No. 3

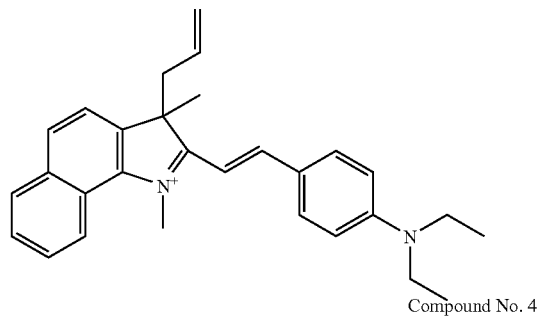

Compound No. 4

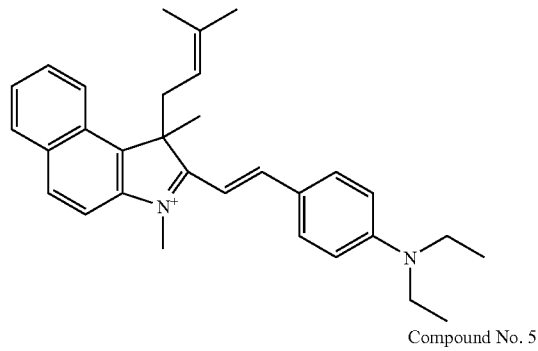

Compound No. 5

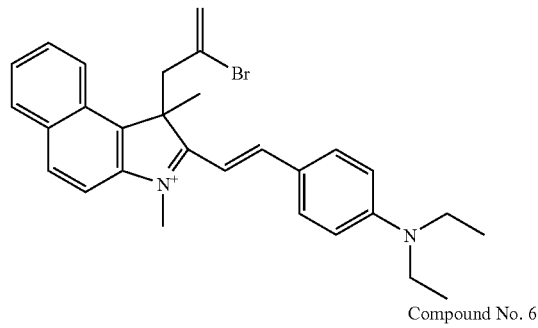

Compound No. 6

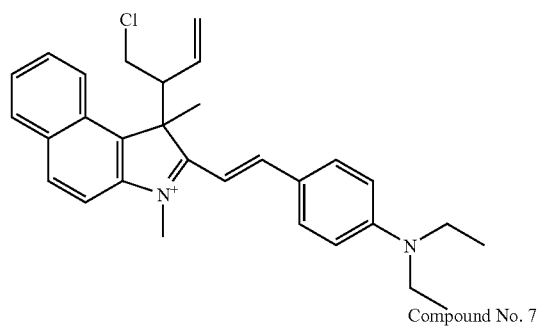

Compound No. 7

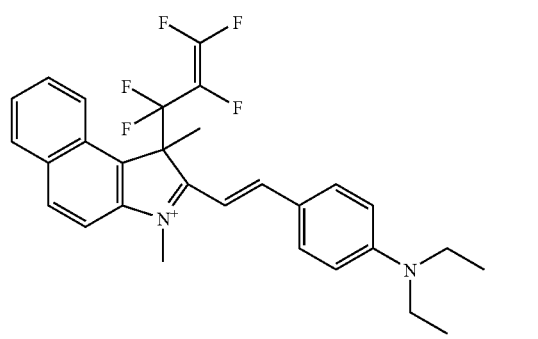

-continued
Compound No. 8
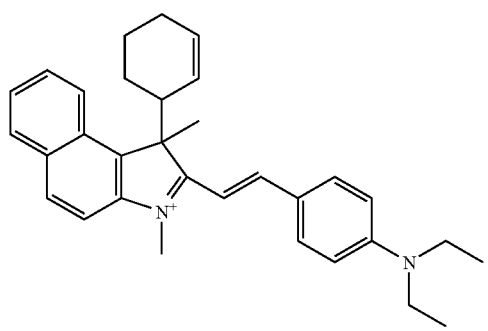
Compound No. 12
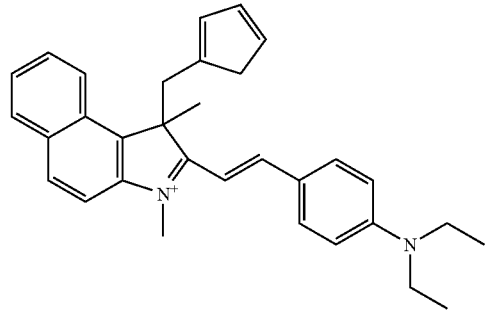
Compound No. 9
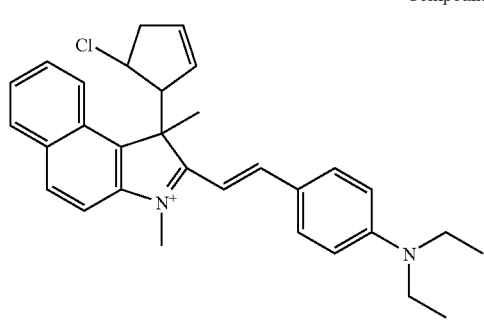
Compound No. 13
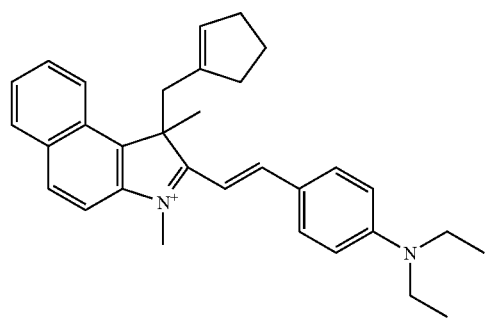
[Formula 6]
Compound No. 10
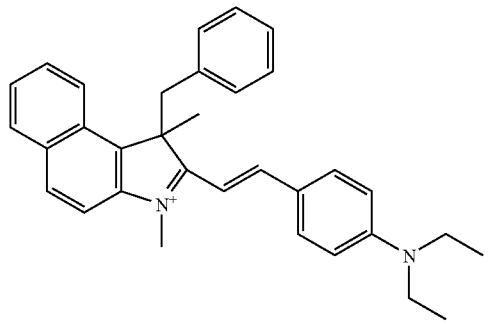
Compound No. 14
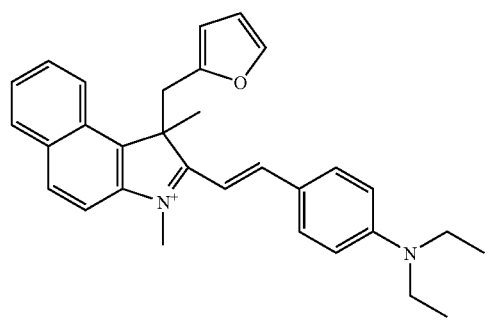
Compound No. 11
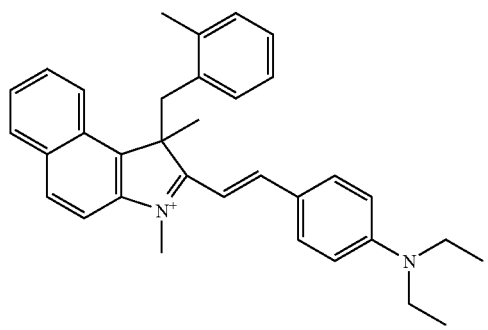
Compound No. 15
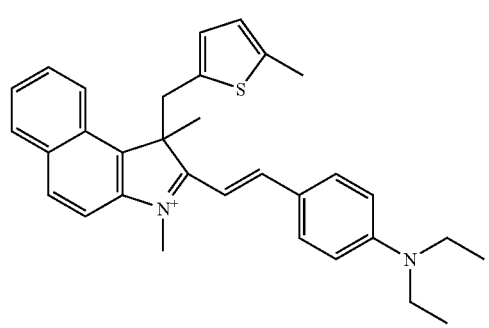

-continued
Compound No. 16
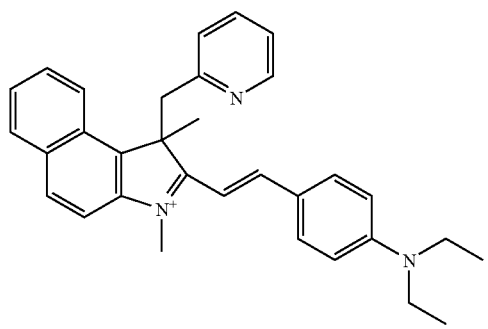
Compound No. 17
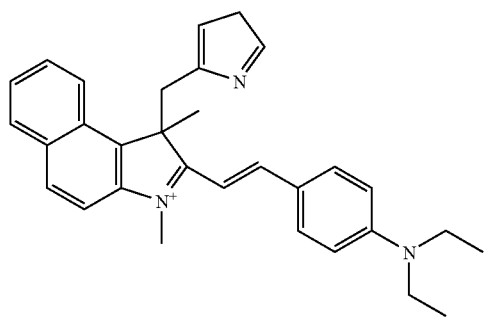
Compound No. 18
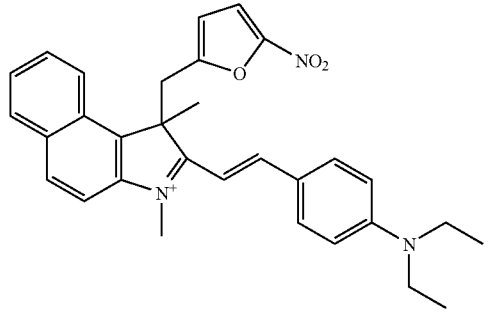
[Formula 7]
Compound No. 19
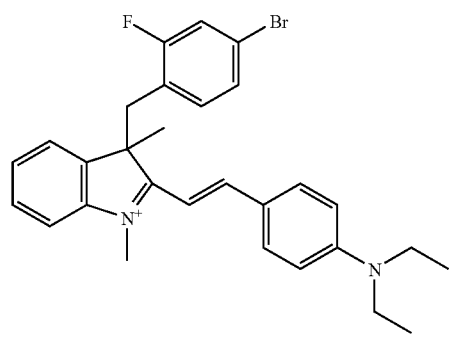
-continued
Compound No. 20
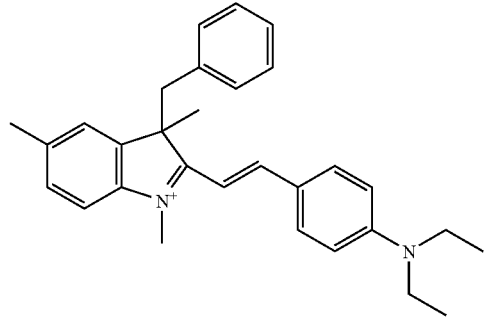
Compound No. 21
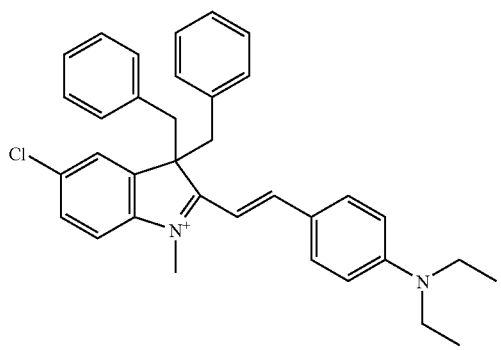
Compound No. 22
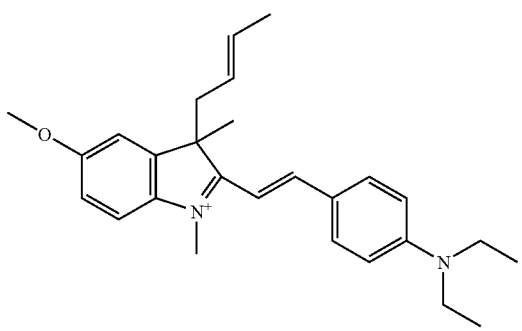
Compound No. 23
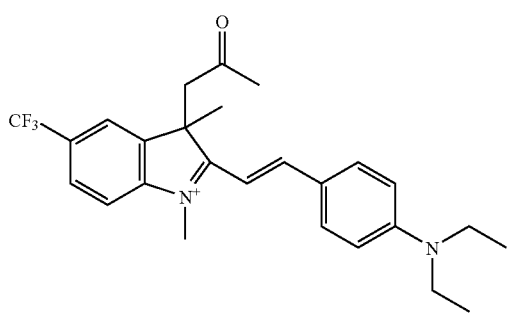

-continued
Compound No. 24
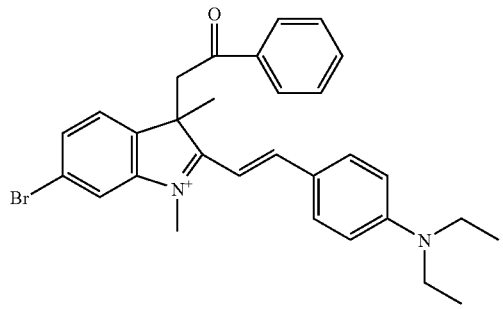
Compound No. 25
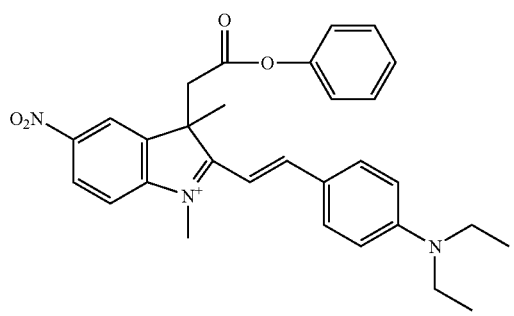
Compound No. 26
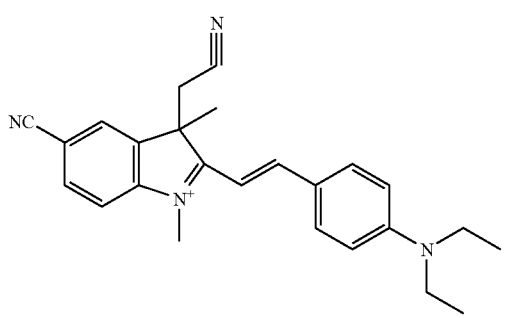
Compound No. 27
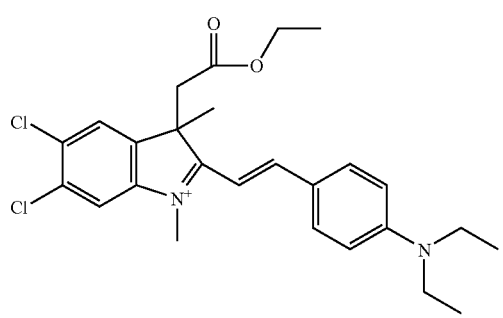
[Formula 8]
Compound No. 28
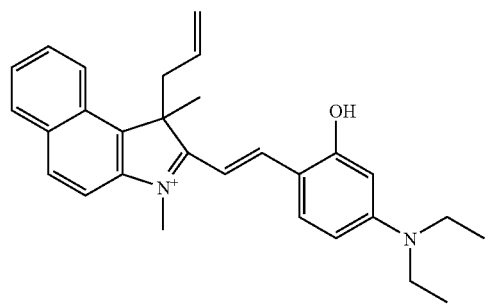
Compound No. 29
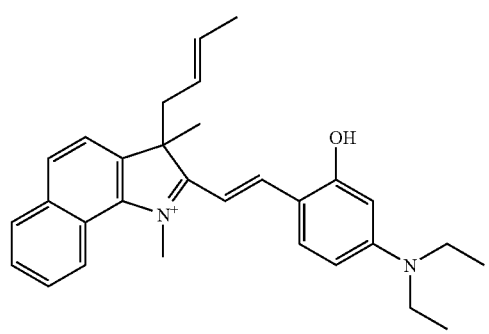
Compound No. 30
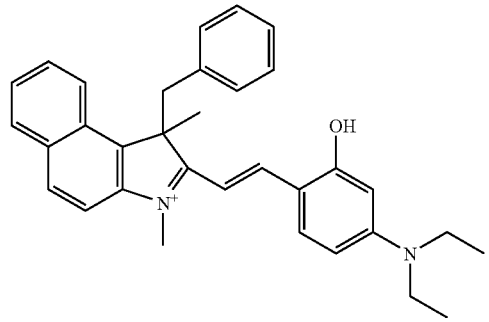
Compound No. 31
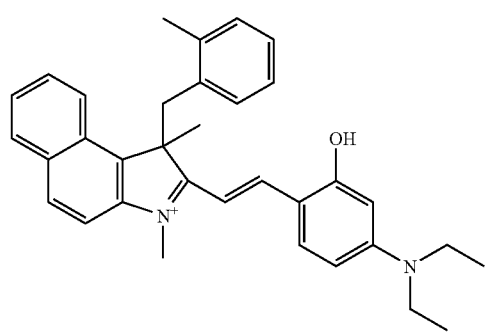

-continued
Compound No. 32
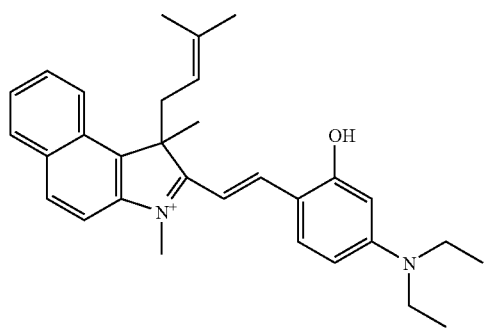
Compound No. 33
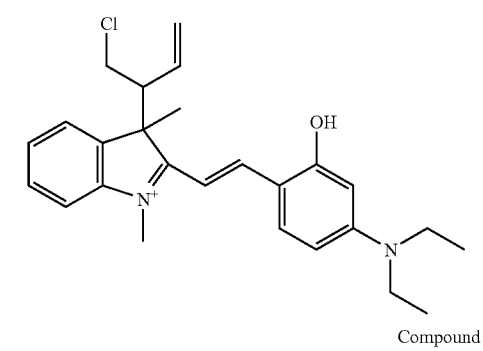
Compound No. 34
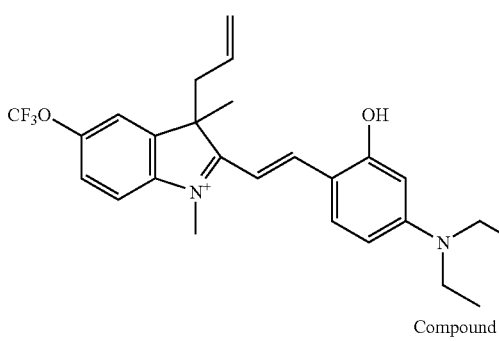
Compound No. 35
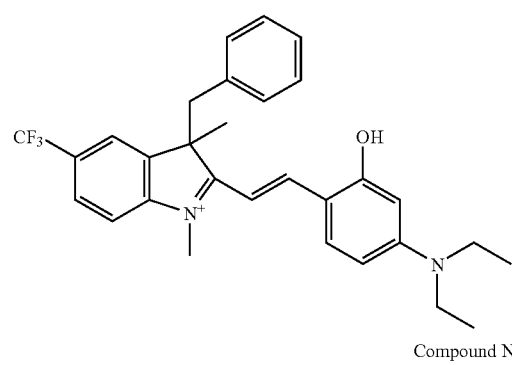
Compound No. 36
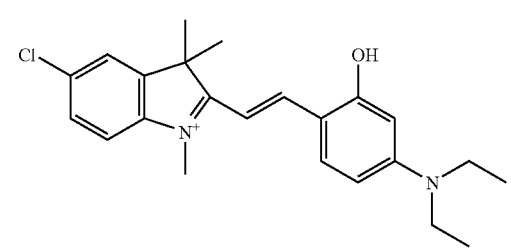
[Formula 9]
Compound No. 37
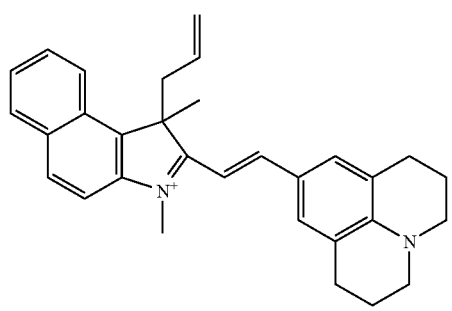
Compound No. 38
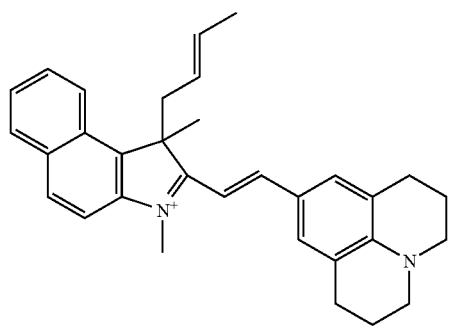
Compound No. 39
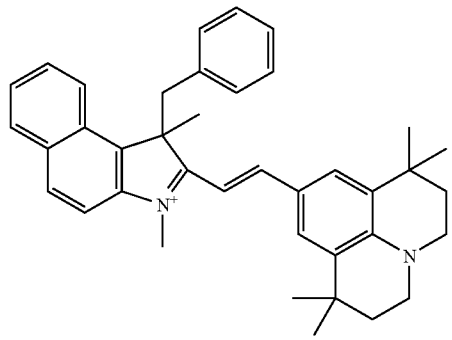
Compound No. 40
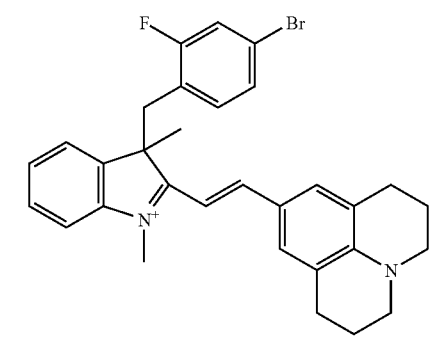

-continued
Compound No. 41
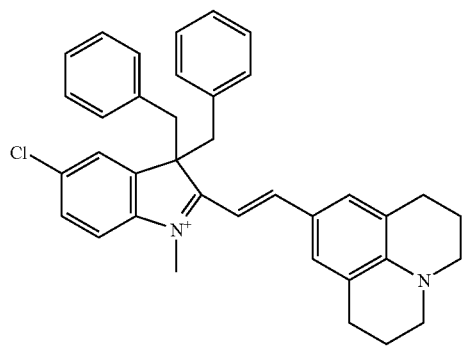
Compound No. 42
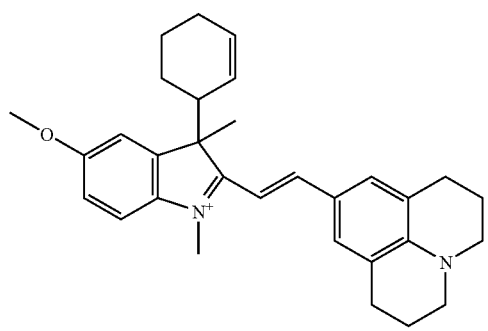
Compound No. 43
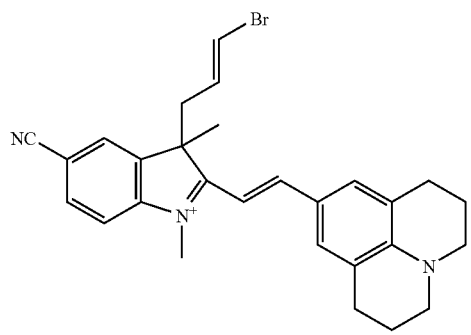
Compound No. 44
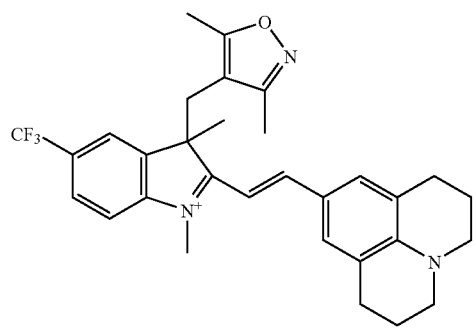
-continued
Compound No. 45
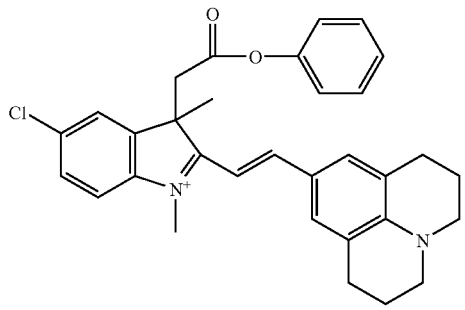
[Formula 10]
Compound No. 46
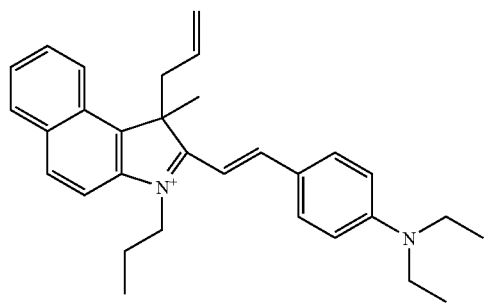
Compound No. 47
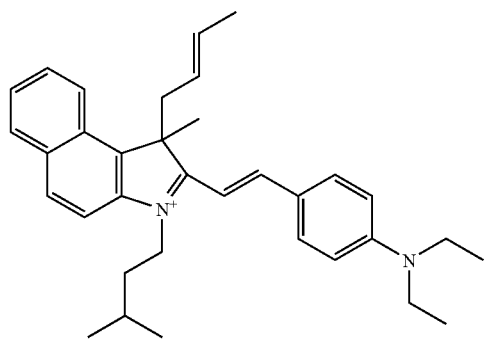
Compound No. 48
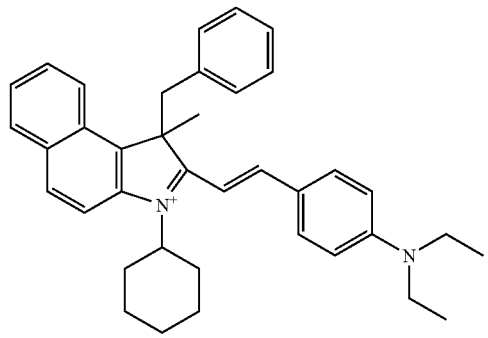

Compound No. 49
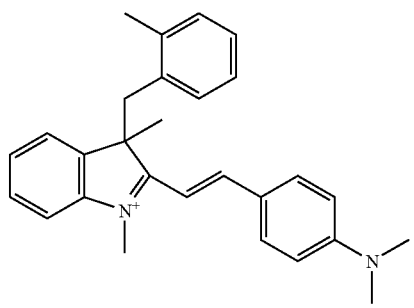

Compound No. 50
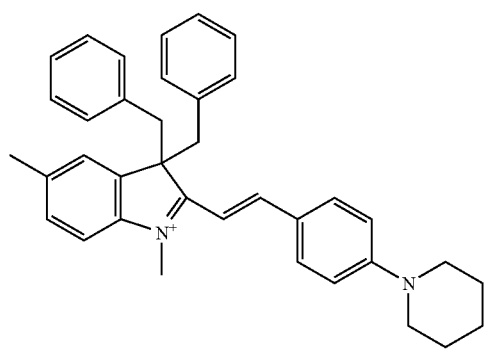

Compound No. 51
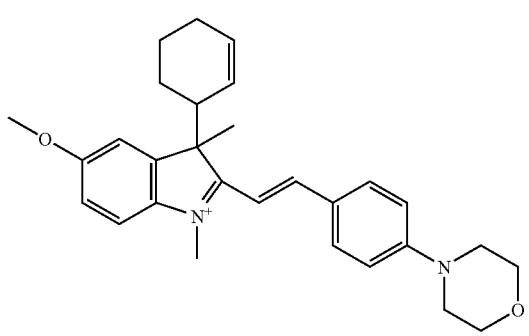

Compound No. 52
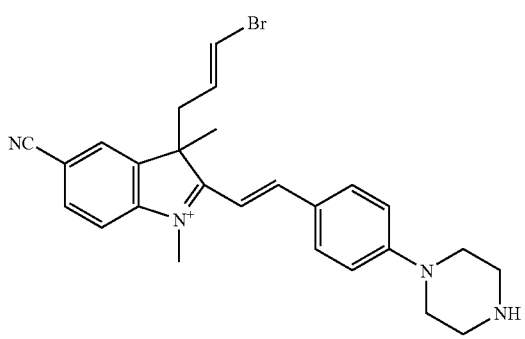

Compound No. 53
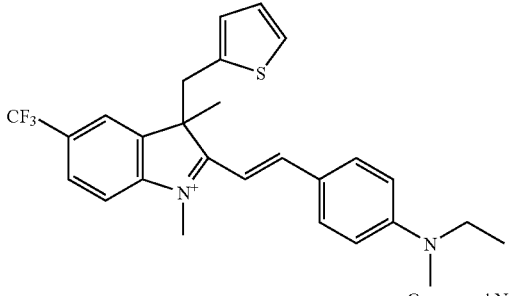

Compound No. 54

The indolium compounds of the present invention represented by general formula (I) or (I') are not limited by their manufacturing method. They can be synthesized, for example, by condensing a 2-methylindole derivative with an aromatic aldehyde derivative, followed by anion exchange.

The multiple bond-containing group represented by general formula (II) or (III) can be introduced in a step for obtaining the 2-methylindole derivative as an intermediate. The methods for this step include, for example, a method of introducing the desired multiple bond-containing group when forming an indole-ring using an arylhydrazine derivative as a starting material with a 2-butanone derivative having the multiple bond-containing group represented by general formula (II) or (III) or a method of reacting the indole ring with a halogenated derivative containing the desired group. $Y^1$ can be introduced using $Y^1$-D (D is, for example, a halogen atom such as chlorine, bromine, or iodine; or a sulfonyloxy group such as phenylsulfonyloxy, 4-methylphenylsulfonyloxy, or 4-chlorophenylsulfonyloxy.) reactive to the NH group of indole ring. The 2-butanone derivative having a multiple bond-containing group represented by general formula (II) or (III) can be obtained by reacting acetone with a benzaldehyde having the corresponding substituent.

The optical recording materials of the present invention are used to form an optical recording layer of an optical recording medium in which the optical recording layer is formed as a thin film on a substrate. The optical recording materials include the indolium compounds of the present invention themselves represented by general formula (I) as well as a mixture of the indolium compound with an organic solvent and/or various compounds described hereinafter.

The method for forming the optical recording layer of the optical recording medium using the optical recording material of the present invention is not particularly limited. Generally is used a wet coating process, in which the indolium compound of the present invention and various compounds described hereinafter, as needed, are dissolved in an organic solvent to prepare a solution and this solution is applied to a substrate by spin coating, spraying, dip coating, or another process. Such organic solvent includes lower alcohols such as methanol and ethanol; ether alcohols such as methyl cellosolve, ethyl cellosolve, butyl cellosolve, and butyl diglycol; ketones such as acetone, methyl ethyl ketone, methyl isobutyl ketone, cyclohexanone, and diacetone alcohol; esters such as ethyl acetate, butyl acetate, and methoxyethyl acetate; acrylates such as ethyl acrylate and butyl acrylate; fluorinated alcohols such as 2,2,2-trifluoroethanol, perfluoroethanol, 2,2,3,3-tetrafluoro-1-propanol, and perfluoropropanol; hydrocarbons such as benzene, toluene, and xylene; chlorohydrocarbons such as methylene dichloride, dichloroethane, and chloroform; and others. Other processes include vapor deposition, sputtering, and others.

The suitable thickness of the optical recording layer is generally 0.001 to 10μ, and preferably 0.01 to 5μ.

When the optical recording material of the present invention is incorporated in the optical recording layer of the optical recording medium, the content of indolium compound of the present invention represented by general formula (I) in the optical recording layer is preferably 25 to 100% by mass. In order to form the optical recording layer with such content of the indolium compound, the optical recording material of the present invention preferably contains 25 to 100% by mass of the indolium compound of the present invention based on solid content in the optical recording material of the present invention.

The optical recording layer may also contain, in addition to the indolium compound of the present invention represented by general formula (I), as needed, dyestuffs used in optical recording layers such as other cyanine compounds, azo compounds, phthalocyanine compounds, oxonol compounds, squarium compounds, styryl compounds, porphine compounds, and azo metal complexes; resins such as polyethylene, polyester, polystyrene, and polycarbonate; surfactants; antistatic agents; lubricants; fire retardants; radical scavengers such as hindered amines; pit formation accelerators such as ferrocene derivatives; dispersants; antioxidants; crosslinking agents; light fastness improvers; and others. Furthermore, the optical recording layer may contain aromatic nitroso compounds, aminium compounds, iminium compounds, bisiminium compounds, transition metal chelate compounds, or others as a quencher of singlet oxygen or others.

Such various compounds are preferably used in a range of 0 to 75% by mass in the optical recording layer. To that end, the content of such various compounds in the optical recording material of the present invention is preferably 0 to 75% by mass based on solid content in the optical recording material of the present invention.

Materials for the substrate on which the optical recording layer is layered are not particularly limited so far as they are substantially transparent to writing (recording) light and reading (play-back) light. They include, for example, resins such as polymethyl methacrylate, polyethylene terephthalate, and polycarbonate, glass, and others. The shape of substrate may be any form including tape, drum, belt, disc, and others according to its application.

On the optical recording layer, a reflective film may be formed with gold, silver, aluminum, copper, or others by vapor deposition or sputtering; and a protective layer may also be formed with acrylic resin, ultraviolet curing resin, or others.

The optical recording material of the present invention is suitable for optical recording media with which a semiconductor laser is used for recording and play-back, particularly for optical discs such as DVD-R compatible with high-speed recording.

The indolium compounds of the present invention can also be used, in addition to the optical recording materials, as light absorbing materials for optical filters in image display devices such as liquid crystal displays or plasma displays.

EXAMPLE

Hereinafter, the present invention will be described in more detail with Examples and Comparative Examples. However, the present invention is not limited at all by Examples or others.

Example 1

Manufacture of Hexafluorophosphate of Compound No. 1

To a reaction flask were charged 0.01 mol of 1,2,3-trimethyl 1-butenylbenzo[e]indolium bromide, 0.01 mol of 4-diethylaminobenzaldehyde, and 23 g of chloroform, and the resultant mixture was stirred at 55° C. for 8.5 hours. The reaction mixture was washed with 20 g of water, 20 g of water and 0.015 mol of potassium hexafluorophosphate were added to the organic phase, and the mixture was stirred at 45° C. for 30 minutes. After the aqueous phase was discarded, 20 g of water and 0.0054 mol of potassium hexafluorophosphate were added to the organic phase, the mixture was stirred at 45° C. for 30 minutes, and then washed with 20 g of water three times. The solvent was distilled off from the organic phase to yield a residue, which was roughly purified by column chromatography on silica gel using ethyl acetate as an eluent to yield crude crystals. To the crude crystals was added 10 g of ethanol, and the ethanol solution was refluxed for 1 hour and then cooled to 25° C. to precipitate crystals. The crystals were collected by filtration and dried under vacuum at 130° C. for 2.5 hours to yield 0.6 g (yield 10.6%) of green crystals. The green crystals obtained were identified as hexafluorophosphate of compound No. 1, the target product. Analytical results of the green crystals are shown below.

(Analytical Results)

Optical properties (chloroform, $1.644 \times 10^{-5}$ mol/l)

$\lambda_{max}$: 585.5 nm, $\epsilon$: $1.01 \times 10^5$

Molecular weight (Time-of-flight mass spectrometry) 568.6

Melting point (determined from the endothermic peak-top in differential thermal analysis (DTA) at a heating rate of 10° C./min under a nitrogen stream of 100 ml/min with a sample weighing 5.87725 mg)

167.6° C.

$^1$H-NMR (solvent: DMSO)

The $^1$H-NMR spectrum is shown in FIG. 1.

Example 2

Manufacture of perchlorate of compound No. 10

To a reaction flask were charged 0.02 mol of 1,2,3-trimethyl-1-benzylbenzo[e]indolium bromide, 0.02 mol of 4-diethylaminobenzaldehyde, and 45 g of methanol, and the resultant mixture was stirred at 55° C. for 2.5 hours. To the reaction mixture were added 22.4 g of chloroform, 44.7 g of water, and 0.03 mol of sodium perchlorate monohydrate, and the mixture was stirred at 45° C. for 30 minutes and then chilled to 25° C. to precipitate crystals. The crystals were collected by filtration, washed with methanol, water, and methanol in this order, and dried under vacuum at 120° C. for 2.5 hours to yield 7.9 g (yield 70.8%) of green crystals. The green crystals obtained were identified as perchlorate salt of compound No. 10, the target product. Analytical results of the green crystals are shown below.

(Analytical Results)

Optical properties (chloroform, $1.297 \times 10^{-5}$ mol/l)

$\lambda_{max}$: 590.0 nm, $\epsilon$: $1.02 \times 10^5$

Molecular weight (Time-of-flight mass spectrometry) 559.1

$^1$H-NMR (solvent: DMSO)

The $^1$H-NMR spectrum is shown in FIG. 2.

Example 3

Manufacture of Hexafluorophosphate of Compound No. 11

To a reaction flask were charged 0.01 mol of 1,2,3-trimethyl-1-(2-methylbenzyl)benzo[e]indolium bromide, 0.01 mol of 4-diethylaminobenzaldehyde, and 25 g of methanol, and the resultant mixture was stirred at 50° C. for 6.5 hours. To the reaction mixture were added 25 g of chloroform, 50 g of water, and 0.015 mol of potassium hexafluorophosphate, and the mixture was stirred at 45° C. for 30 minutes. After discarding the aqueous phase, 30 g of water and 0.0076 mol of potassium hexafluorophosphate were added to the organic phase. The resultant mixture was stirred at 45° C. for 30 minutes, the organic phase was washed with 30 g of water twice, and the solvent was distilled off to yield a residue. To this residue was added 25 g of methanol for crystallization, and crystals precipitated were collected by filtration, washed with methanol, and dried under vacuum at 130° C. for 2.5 hours to yield 5.05 g (yield 81.6%) of green crystals. The green crystals obtained were identified as hexafluorophosphate of compound No. 11, the target product. Analytical results of the green crystals are shown below.

(Analytical Results)

Optical properties (chloroform, $1.810 \times 10^{-5}$ mol/l)

$\lambda_{max}$: 589.0 nm, $\epsilon$: $1.02 \times 10^5$

Molecular weight (Time-of-flight mass spectrometry) 618.7

Melting point (determined from the endothermic peak-top in differential thermal analysis (DTA) at a heating rate of 10° C./min under a nitrogen stream of 100 ml/min with a sample weighing 3.72686 mg)

203.0° C.

$^1$H-NMR (solvent: DMSO)

The $^1$H-NMR spectrum is shown in FIG. 3.

Example 4

Manufacture of Hexafluorophosphate of Compound No. 18

To a reaction flask were charged 0.005 mol of 1,2,3-trimethyl-1-[(5-nitrofuran-2-yl)methyl]benzo[e]indolium bromide, 0.005 mol of 4-diethylaminobenzaldehyde, and 13 g of methanol, and the resultant mixture was stirred at 55° C. for 6.5 hours. To the reaction mixture were added 15 g of chloroform, 30 g of water, and 0.0075 mol of potassium hexafluorophosphate, and the mixture was stirred at 45° C. for 30 minutes. After discarding the aqueous phase, 30 g of water and 0.0038 mol of potassium hexafluorophosphate were added to the organic phase, the mixture was stirred at 45° C. for 30 minutes, the organic phase was washed with 30 g of water twice, and the solvent was distilled off to yield a residue. To the residue were added 4.0 g of methanol and 26 g of ethanol for crystallization, and crystals precipitated were collected by filtration, washed with ethanol, and dried under vacuum at 130° C. for 2.5 hours to yield 2.3 g (yield 71.9%) of green crystals. The green crystals obtained were identified as hexafluorophosphate of compound No. 18, the target product. Analytical results of the green crystals are shown below.

(Analytical Results)

Optical properties (chloroform, $8.990 \times 10^{-6}$ mol/l)

$\lambda_{max}$: 595.5 nm, $\epsilon$: $1.12 \times 10^5$

Molecular weight (Time-of-flight mass spectrometry) 639.6

Melting point (determined from the endothermic peak-top in differential thermal analysis (DTA) at a heating rate of 10° C./min under a nitrogen stream of 100 ml/min with a sample weighing 2.41224 mg)

156.0° C.

$^1$H-NMR (solvent: DMSO)

The $^1$H-NMR spectrum is shown in FIG. 4.

Example 5

Manufacture of Tetrafluoroborate of Compound No. 21

To a reaction flask were charged 0.02 mol of 1,2-dimethyl-3,3-dibenzyl-5-chloroindolium bromide, 0.02 mol of 4-diethylaminobenzaldehyde, and 49 g of methanol, and the resultant mixture was stirred at 45° C. for 6.5 hours. To the reaction mixture were added 24 g of chloroform and 49 g of water, the mixture was stirred for 30 minutes, and the aqueous phase was discarded. Then, 20 g of water and 0.03 mol of sodium tetrafluoroborate were added to the organic phase, and the mixture was stirred at 45° C. for 30 minutes. After discarding the aqueous phase, 20 g of water and 0.0092 mol of sodium tetrafluoroborate were added to the organic phase, and the mixture was stirred at 45° C. for 30 minutes. After discarding the aqueous phase, the organic phase was washed with 20 g of water twice, and the solvent was distilled off to yield a residue. To this residue was added 64 g of ethyl acetate, and the solution was refluxed for 1 hour and then cooled to 25° C. Crystals were collected by filtration, washed with ethyl acetate, and dried under vacuum at 120° C. for 2.5 hours to give 8.8 g (yield 72.2%) of green crystals. The green crystals obtained were identified as tetrafluoroborate of compound No. 21, the target product. Analytical results of green crystals are shown below.

(Analytical Results)

Optical properties (chloroform, $1.005 \times 10^{-5}$ mol/l)

$\lambda_{max}$: 585.0 nm, $\epsilon$: $1.37 \times 10^5$

Molecular weight (Time-of-flight mass spectrometry) 606.9

Melting point (determined from the endothermic peak-top in differential thermal analysis (DTA) at a heating rate of 10° C./min under a nitrogen stream of 100 ml/min with a sample weighing 5.54875 mg)
157.8° C.
$^1$H-NMR (solvent: DMSO)
The $^1$H-NMR spectrum is shown in FIG. 5.

Example 6

Manufacture of Perchlorate of Compound No. 30

To a reaction flask were charged 0.02 mol of 1,2,3-trimethyl-1-benzylbenzo[e]indolium bromide, 0.02 mol of 4-diethylaminosalicylaldehyde, and 46 g of methanol, the resultant mixture was stirred at 45° C. for 12 hours. To the reaction mixture were added 50 g of chloroform and 50 g of water, the mixture was stirred for 30 minutes, and then the aqueous phase was discarded. To the organic phase, 50 g of water and 0.03 mol of sodium perchlorate monohydrate were added, the mixture was stirred at 45° C. for 30 minutes, and the aqueous phase was discarded. To the organic phase were added 50 g of water and 0.0071 mol of sodium perchlorate monohydrate, the mixture was stirred at 45° C. for 30 minutes, and the aqueous phase was discarded. The organic phase was washed with 50 g of water twice, and the solvent was distilled off to yield a residue. To the residue was added 7.7 g of methanol, the residue was dissolved with warming, and 78 g of ethyl acetate was added to the solution. Crystals precipitated were collected by filtration, washed with ethyl acetate, and dried under vacuum at 130° C. for 2.5 hours to yield 7.0 g (yield 60.9%) of green crystals. The green crystals obtained were identified as perchlorate of compound No. 30, the target product. Analytical results of the green crystals are shown below.

(Analytical Results)
Optical properties (chloroform, $1.495 \times 10^{-5}$ mol/l)
$\lambda_{max}$: 584.5 nm, $\epsilon$: $1.38 \times 10^5$
Molecular weight (Time-of-flight mass spectrometry)
575.5
Melting point (determined from the endothermic peak-top in differential thermal analysis (DTA) at a heating rate of 10° C./min under a nitrogen stream of 100 ml/min with a sample weighing 4.14182 mg)
194.3° C.
$^1$H-NMR (solvent: DMSO)
The $^1$H-NMR spectrum is shown in FIG. 6.

Example 7

Manufacture of Perchlorate of Compound No. 31

To a reaction flask were charged 0.02 mol of 1,2,3-trimethyl-1-(2-methylbenzyl)benzo[e]indolium bromide, 0.02 mol of 4-diethylaminosalicylaldehyde, and 47 g of methanol, the resultant mixture was stirred at 55° C. for 10 hours. To the reaction mixture were added 50 g of chloroform and 60 g of water, the mixture was stirred for 30 minutes, and the aqueous phase was discarded. To the organic phase were added 50 g of water and 0.03 mol of sodium perchlorate monohydrate, the mixture was stirred at 45° C. for 30 minutes, and the aqueous phase was discarded. To the organic phase were added 50 g of water and 0.011 mol of sodium perchlorate monohydrate, the mixture was stirred at 45° C. for 30 minutes, and the aqueous phase was discarded. The organic phase was washed with 50 g of water twice, and the solvent was distilled off to yield a residue. To this residue, 16.5 g of methanol was added, the residue was dissolved with warming, and 33 g of ethyl acetate was added to the solution. Crystals precipitated were collected by filtration, washed with ethyl acetate, and dried under vacuum at 130° C. for 2.5 hours to yield 8.8 g (yield 74.7%) of purple crystals. The purple crystals obtained were identified as perchlorate of compound No. 31, the target product. Analytical results of the purple crystals are shown below.

(Analytical Results)
Optical properties (chloroform, $9.760 \times 10^{-6}$ mol/l)
$\lambda_{max}$: 584.0 nm, $\epsilon$: $1.31 \times 10^5$
Molecular weight (Time-of-flight mass spectrometry)
589.1
Melting point (determined from the endothermic peak-top in differential thermal analysis (DTA) at a heating rate of 10° C./min under a nitrogen stream of 100 ml/min with a sample weighing 4.22797 mg)
200.9° C.
$^1$H-NMR (solvent: DMSO)
The $^1$H-NMR spectrum is shown in FIG. 7.

Example 8

Manufacture of Perchlorate of Compound No. 40

To a reaction flask were charged 0.003 mol of 1,2,3-trimethyl-3-(2-fluoro-4-bromobenzyl)indolium bromide, 0.003 mol of durolidine-9-carbaldehyde, and 9.45 g of chloroform, and the resultant mixture was stirred at 45° C. for 15.5 hours. To the reaction mixture was added 10 g of water, the mixture was stirred for 30 minutes, and the aqueous phase was discarded. To the organic phase were added 10 g of water and 0.006 mol of sodium perchlorate monohydrate, and the mixture was stirred at 45° C. for 30 minutes. After the aqueous phase was discarded, 10 g of water and 0.003 mol of sodium perchlorate monohydrate were added to the organic phase, the mixture was stirred at 45° C. for 30 minutes, and the aqueous phase was discarded. The organic phase was washed with 10 g of water twice, and the solvent was distilled off to yield a residue. To this residue was added 1.5 g of methanol, the residue was dissolved with warming, and 15 g of ethyl acetate was added to the solution. Crystals precipitated were collected by filtration, washed with ethyl acetate, and dried under vacuum at 120° C. for 2.5 hours to yield 0.9 g (yield 47.6%) of purple crystals. The purple crystals obtained were identified as perchlorate of compound No. 40, the target product. Analytical results of the purple crystals are shown below.

(Analytical Results)
Optical properties (chloroform, $1.064 \times 10^{-5}$ mol/l)
$\lambda_{max}$: 598.0 nm, $\epsilon$: $1.43 \times 10^5$
Molecular weight (Time-of-flight mass spectrometry)
630.0
$^1$H-NMR (solvent: DMSO)
The $^1$H-NMR spectrum is shown in FIG. 8.

Example 9

Differential thermal analysis was performed with the indolium compounds obtained in Examples above and Comparative Compounds 1 and 2 below to determine the thermal decomposition temperature and heat released on decomposition. The thermal decomposition temperature is defined as the temperature at the exothermic peak-top in DTA at a heating rate of 10° C./min under nitrogen atmosphere. The results are shown in Table 1.

TABLE 1

[Formula 11]

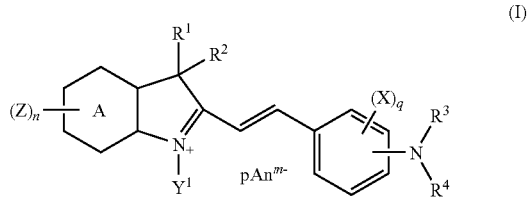

Comparative Compound 1

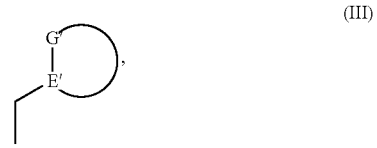

Comparative Compound 2

|  | Indolium compounds | | Thermal decomposition temperature (° C.) |
| --- | --- | --- | --- |
|  | Cation | Anion |  |
| Example 9-1 | Compound No. 1 | $PF_6^-$ | 204 |
| Example 9-2 | Compound No. 11 | $PF_6^-$ | 209 |
| Example 9-3 | Compound No. 18 | $PF_6^-$ | 197 |
| Example 9-4 | Compound No. 21 | $BF_4^-$ | 217 |
| Example 9-5 | Compound No. 31 | $ClO_4^-$ | 208 |
| Example 9-6 | Compound No. 40 | $ClO_4^-$ | 198 |
| Comparative Example 1 | Comparative Compound 1 (anion: $PF_6^-$) | | 242 |
| Comparative Example 2 | Comparative Compound 2 (anion: $ClO_4^-$) | | 254 |

As clearly seen in Table 1, the indolium compounds of the present invention are decomposed at lower temperatures as compared to similar indolium compounds. This fact confirms the indolium compounds of the present invention have thermal decomposition behavior suitable for optical recording materials.

INDUSTRIAL APPLICABILITY

The present invention provides the indolium compounds showing thermal decomposition behavior further suitable for optical recording materials used in an optical recording layer of optical recording media for high-speed recording, and the optical recording material comprising the compound.

The invention claimed is:
1. An indolium compound represented by general formula (I):

(I)

wherein,
ring A represents a benzene or naphthalene ring;
Z represents an optionally halogenated alkyl group having 1 to 8 carbon atoms that is optionally interrupted by —O—, —CO—, —OCO—, or —COO—, a sulfonyl group containing a hydrocarbon group having 1 to 8 carbon atoms, a sulfinyl group containing a hydrocarbon group having 1 to 8 carbon atoms, an alkylamino group wherein the alkyl group has 1 to 8 carbon atoms, a dialkylamino group wherein each alkyl group has 1 to 8 carbon atoms, a cyano group, a nitro group, a hydroxyl group, or a halogen atom;
at least one of $R^1$ and $R^2$ represents a group represented by general formula (III):

(III)

wherein the bond between E' and G' is a double bond, E' represents a carbon atom, G' represents a carbon atom, an oxygen atom, or a nitrogen atom, the ring containing E' and G' represents a five-membered ring optionally containing a heteroatom, a six-membered ring optionally containing a heteroatom, a naphthalene ring, a quinoline ring, an isoquinoline ring, an anthracene ring, or an anthraquinone ring, and the ring containing E' and G' may be substituted with a halogen atom, a nitro group, a cyano group, an alkyl group, or an alkoxy group, and when only one of $R^4$ and $R^2$ is a group represented by general formula (III), the other represents an alkyl alkenyl, alkylaryl, or aralkyl group having 1 to 30 carbon atoms, these hydrocarbon groups which are interrupted by an ether and/orthioether bond, or these hydrocarbon groups which are further substituted with an alkoxy group, an alkenyl group, a nitro group, a cyano group, or a halogen atom;
$R^3$ and $R^4$ each represent a hydrogen atom or an alkyl alkenyl, alkylaryl, or aralkyl group having 1 to 30 carbon atoms, these hydrocarbon groups which are interrupted by an ether and/orthioether bond, or these hydrocarbon groups which are further substituted with an alkoxy group, an alkenyl group, a nitro group, a cyano group, or a halogen atom, or $R^3$ and $R^4$ bond to represent a group forming a five- or six-membered heterocycle containing no multiple bonds or a group forming a five- or six-membered ring condensed with the benzene ring to which $NR^3R^4$ bonds;
X represents an alkyl group having 1 to 8 carbon atoms that is optionally substituted with a halogen atom or a hydroxyl group or optionally interrupted by an ether bond, an alkoxy group having 1 to 8 carbon atoms that is optionally substituted with a halogen atom or a hydroxyl group or optionally interrupted by an ether bond, a hydroxyl group, a nitro group, a cyano group, or a halogen atom;

$Y^1$ represents a hydrogen atom or an alkyl alkenyl, alkylaryl, or aralkyl group having 1 to 30 carbon atoms, these hydrocarbon groups which are interrupted by an ether and/orthioether bond, or these hydrocarbon groups which are further substituted with an alkoxy group, an alkenyl group, a nitro group, a cyano group, or a halogen atom;

n represents an integer of 0 to 4;

q represents an integer of 0 to 4;

$An^{m-}$ represents an m-valent anion;

m represents 1 or 2; and p represents a coefficient to keep the electric charge neutral.

2. An indolium compound represented by general formula (I'):

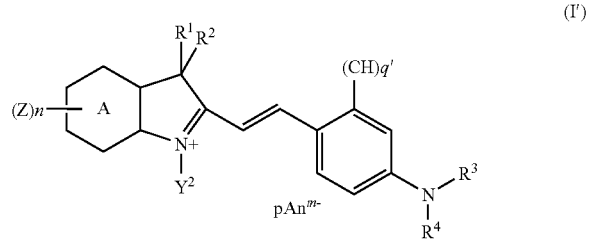

ring A represents a benzene or naphthalene ring;

Z represents an optionally halogenated alkyl group having 1 to 8 carbon atoms that is optionally interrupted by —O—, —CO—, —OCO—, or —COO—, a sulfonyl group containing a hydrocarbon group having 1 to 8 carbon atoms, a sulfinyl group containing a hydrocarbon group having 1 to 8 carbon atoms, an alkylamino group wherein the alkyl group has 1 to 8 carbon atoms, a dialkylamino group wherein each alkyl group has 1 to 8 carbon atoms, a cyano group, a nitro group, a hydroxyl group, or a halogen atom;

$R^3$ and $R^4$ each represent a hydrogen atom or an alkyl alkenyl, alkylaryl, or aralkyl group having 1 to 30 carbon atoms, these hydrocarbon groups which are interrupted by an ether and/orthioether bond, or these hydrocarbon groups which are further substituted with an alkoxy group, an alkenyl group, a nitro group, a cyano group, or a halogen atom, or $R^3$ and $R^4$ bond to represent a group forming a five- or six-membered heterocycle containing no multiple bonds or a group forming a five- or six-membered ring condensed with the benzene ring to which $NR^3R^4$ bonds;

n represents an integer of 0 to 4;

$An^{m-}$ represents an m-valent anion;

m represents 1 or 2;

p represents a coefficient to keep the electric charge neutral; and at least one of $R'^1$ and $R'^2$ represents a group represented by general formula (III):

wherein, the bond between E' and G' is a double bond; E' represents a carbon atom, G' represents a carbon atom, an oxygen atom, or a nitrogen atom, the ring containing E' and G' represents a five-membered ring optionally containing a heteroatom, a six-membered ring optionally containing a heteroatom, a naphthalene ring, a quinoline ring, an isoquinoline ring, an anthracene ring, or an anthraquinone ring, and the ring containing E' and G' may be substituted with a halogen atom, a nitro group, a cyano group, an alkyl group, or an alkoxy group, and when only one of $R'^1$ and $R'^2$ is a group represented by general formula (III), the other represents an alkyl group having 1 to 4 carbon atoms;

$Y^2$ represents an alkyl group having 1 to 8 carbon atoms; and q' represents 0 or 1.

3. The indolium compound according to claim 1, wherein the group(s) represented by $R^3$ and $R^4$ in general formula (I) is/are alkyl groups each having 1 to 8 carbon atoms, a group in which $R^3$ and $R^4$ bond to form a five- or six-membered heterocycle containing no multiple bonds, or a group in which $R^3$ and $R^4$ bond to form a five- or six-membered ring condensed with the benzene ring to which $NR^3R^4$ bonds.

4. An optical recording material comprising the indolium compound according to claim 1 to be used in an optical recording layer of an optical recording medium in which the optical recording layer is formed on a substrate.

5. The indolium compound according to claim 2, wherein the group(s) represented by $R^3$ and $R^4$ in general formula (I') is/are alkyl groups each having 1 to 8 carbon atoms, a group in which $R^3$ and $R^4$ bond to form a five- or six-membered heterocycle containing no multiple bonds, or a group in which $R^3$ and $R^4$ bond to form a five- or six-membered ring condensed with the benzene ring to which $NR^3R^4$ bonds.

6. An optical recording material comprising the indolium compound according to claim 2 to be used in an optical recording layer of an optical recording medium in which the optical recording layer is formed on a substrate.

7. An optical recording material comprising the indolium compound according to claim 3 to be used in an optical recording layer of an optical recording medium in which the optical recording layer is formed on a substrate.

8. An optical recording material comprising the indolium compound according to claim 5 to be used in an optical recording layer of an optical recording medium in which the optical recording layer is formed on a substrate.

* * * * *